US009904395B2

(12) United States Patent
Ogura et al.

(10) Patent No.: US 9,904,395 B2
(45) Date of Patent: Feb. 27, 2018

(54) PRESSURE SENSOR COMPRISING FIRST PRESSURE SENSITIVE ELEMENT AND SECOND PRESSURE SENSITIVE ELEMENT

(71) Applicant: Panasonic Intellectual Property Management Co., Ltd., Osaka (JP)

(72) Inventors: Tetsuyoshi Ogura, Osaka (JP); Keiji Noine, Osaka (JP); Shinobu Masuda, Osaka (JP); Kenichi Ezaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/075,225

(22) Filed: Mar. 21, 2016

(65) Prior Publication Data
US 2016/0283007 A1 Sep. 29, 2016

(30) Foreign Application Priority Data

Mar. 25, 2015 (JP) .................................. 2015-063217

(51) Int. Cl.
*G06F 3/041* (2006.01)
*G01L 9/12* (2006.01)
(Continued)

(52) U.S. Cl.
CPC ............ *G06F 3/0414* (2013.01); *G01L 1/144* (2013.01); *G01L 1/146* (2013.01); *G01L 9/12* (2013.01);
(Continued)

(58) Field of Classification Search
CPC ....... G06F 3/044; G06F 3/0414; G06F 3/0416
(Continued)

(56) References Cited

U.S. PATENT DOCUMENTS

2004/0119701 A1* 6/2004 Mulligan ................ G06F 3/044
345/173
2011/0148812 A1* 6/2011 Hente ................... H03K 17/962
345/174
(Continued)

FOREIGN PATENT DOCUMENTS

EP 172784 2/1986
EP 1469415 10/2004
(Continued)

OTHER PUBLICATIONS

The Extended European Search Report dated Aug. 22, 2016 for the related European Patent Application No. 16160263.6.

*Primary Examiner* — Calvin C Ma
(74) *Attorney, Agent, or Firm* — McDermott Will & Emery LLP

(57) ABSTRACT

A pressure sensor according to an aspect of the present disclosure includes: a first pressure sensitive element including a first conductive layer including first projections having conductivity, first wiring layers, and a first dielectric layer provided between the first projections and the first wiring layers; and a second pressure sensitive element including a second conductive layer including second projections having conductivity, second wiring layers, and a second dielectric layer provided between the second projections and the second wiring layers. The first pressure sensitive element and the second pressure sensitive element are stacked on each other.

18 Claims, 13 Drawing Sheets

(51) Int. Cl.
  *G01L 1/14*      (2006.01)
  *G06F 3/044*     (2006.01)

(52) U.S. Cl.
  CPC .... *G06F 3/044* (2013.01); *G06F 2203/04106* (2013.01)

(58) Field of Classification Search
  USPC ................................................ 345/173, 174
  See application file for complete search history.

(56) References Cited

U.S. PATENT DOCUMENTS

| | | |
|---|---|---|
| 2013/0047747 A1 | 2/2013 | Joung |
| 2014/0085247 A1* | 3/2014 | Leung .................. G06F 3/0414 345/174 |
| 2014/0104184 A1 | 4/2014 | Meador et al. |
| 2014/0152618 A1* | 6/2014 | Ando ..................... G06F 3/044 345/174 |
| 2015/0091849 A1* | 4/2015 | Ludden ................ G06F 3/0412 345/174 |
| 2015/0091859 A1* | 4/2015 | Rosenberg ............. G06F 3/044 345/174 |
| 2015/0378493 A1* | 12/2015 | Kano ..................... G06F 3/044 345/173 |

FOREIGN PATENT DOCUMENTS

| | | |
|---|---|---|
| EP | 2014227 | 1/2009 |
| JP | 1-092632 | 4/1989 |
| JP | 9-043081 | 2/1997 |
| JP | 2007-315875 | 12/2007 |
| JP | 2012-026906 | 2/2012 |
| JP | 2014-142193 | 8/2014 |
| WO | 2011/125725 | 10/2011 |

* cited by examiner

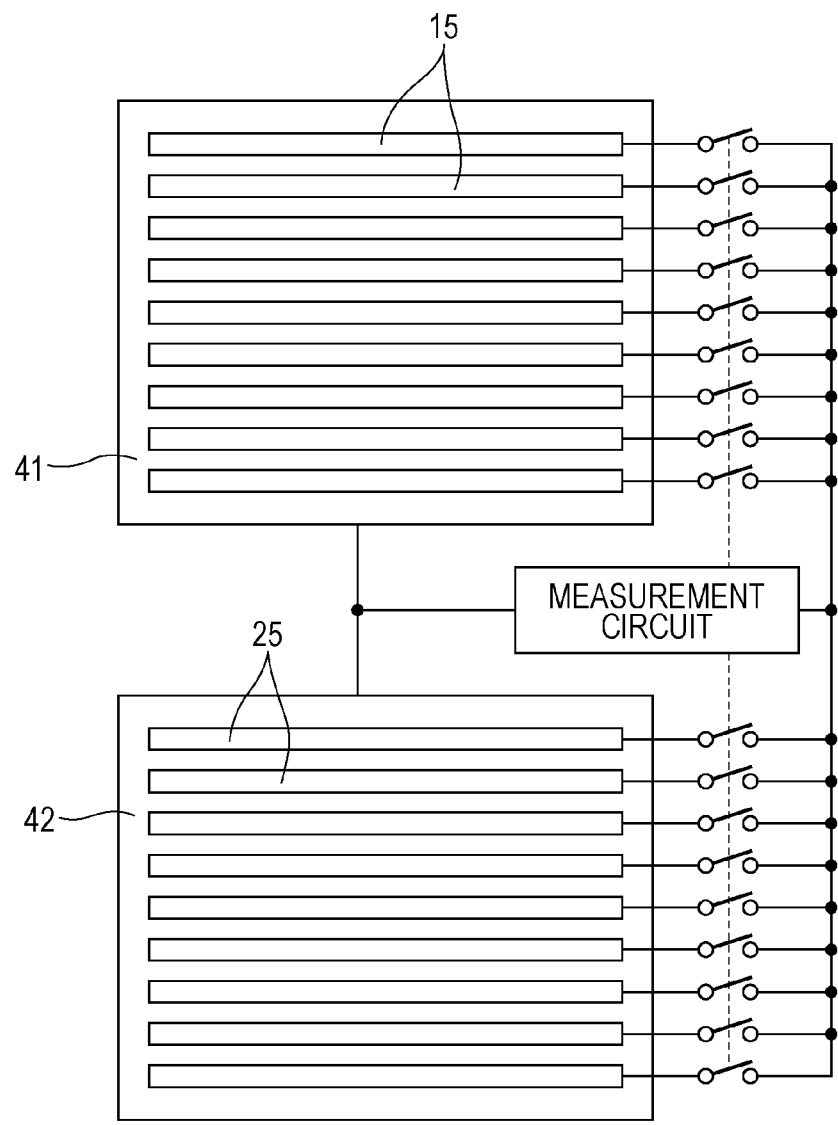

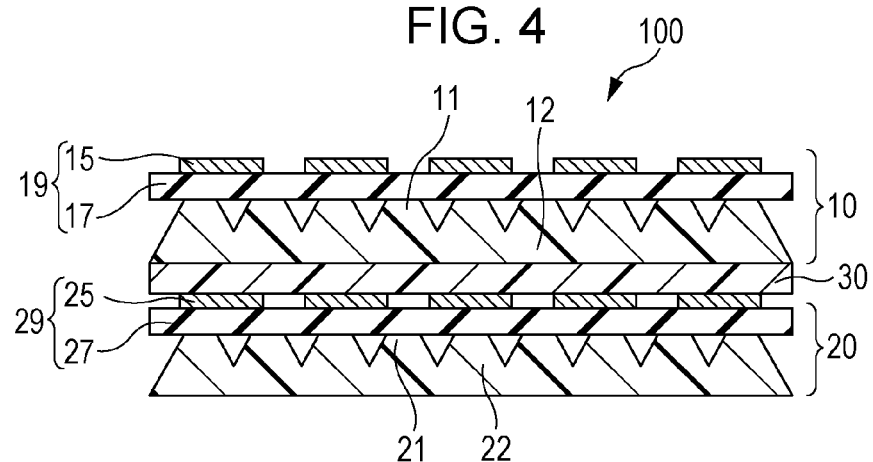
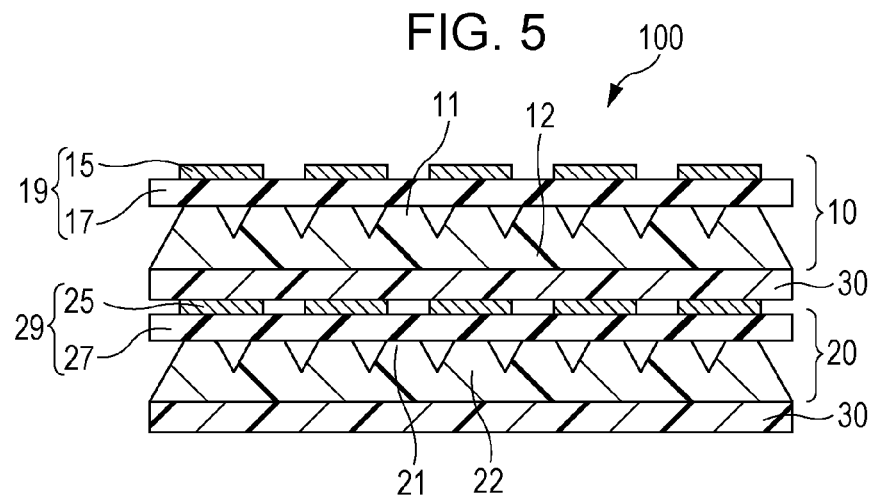
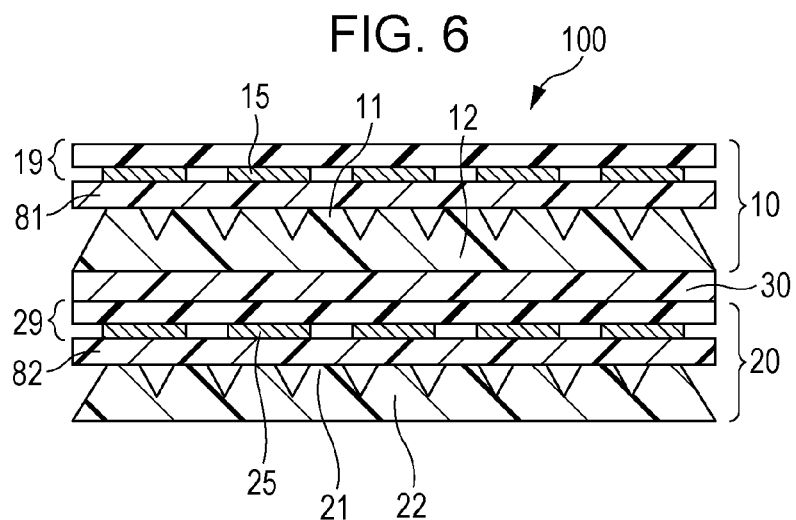

PRESSURE SENSOR COMPRISING FIRST PRESSURE SENSITIVE ELEMENT AND SECOND PRESSURE SENSITIVE ELEMENT

BACKGROUND

1. Technical Field

The present disclosure relates to a pressure sensor. More specifically, the present disclosure relates to an electrostatic capacitance type pressure sensor that can be used in various electronic devices.

2. Description of the Related Art

In recent years, high functionality and diversification of various electronic devices such as smartphones and car navigation systems have been rapidly achieved. In conjunction with this, reliable operativity of a pressure sensitive element, which is a component of electronic devices, is also called for. The pressure sensitive element is a sensor that is composed of a material such as an elastic material, and that performs detection based on a load applied from the outside of the elastic material. Thus, such a pressure sensitive element can be preferably utilized as a "sensor element" in various electronic devices.

In particular, a device has been devised which is configured to detect change in electrostatic capacitance due to application of load using pressure sensitive elements in a matrix form so that the position of the load on a two-dimensional plane is detectable.

SUMMARY

In one general aspect, the techniques disclosed here feature a pressure sensor including: a first pressure sensitive element including a first conductive layer including first projections having conductivity, first wiring layers, and a first dielectric layer provided between the first projections and the first wiring layers; and a second pressure sensitive element including a second conductive layer including second projections having conductivity, second wiring layers, and a second dielectric layer provided between the second projections and the second wiring layers. The first pressure sensitive element and the second pressure sensitive element are stacked on each other.

The pressure sensor according to an aspect of the present disclosure provides a device capable of measuring load distribution in a plane, whereas the entire structure of the device is relatively simple. In particular, the pressure sensitive elements stacked on each other are similar and the same type, and thus the device structure is overall simple. In addition, due to this structure of the device, the circuit configuration is also overall simple.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3C is a schematic diagram illustrating the circuit configuration of the pressure sensor according to the second embodiment of the present disclosure;

FIG. 4 is a schematic sectional view illustrating a modification of the stacked configuration of a pressure sensor according to an aspect of the present disclosure;

FIG. 5 is a schematic sectional view illustrating a modification of the stacked configuration of the pressure sensor according to an aspect of the present disclosure;

FIG. 6 is a schematic sectional view illustrating a modification of the stacked configuration of the pressure sensor according to an aspect of the present disclosure;

DETAILED DESCRIPTION

Figure 1:
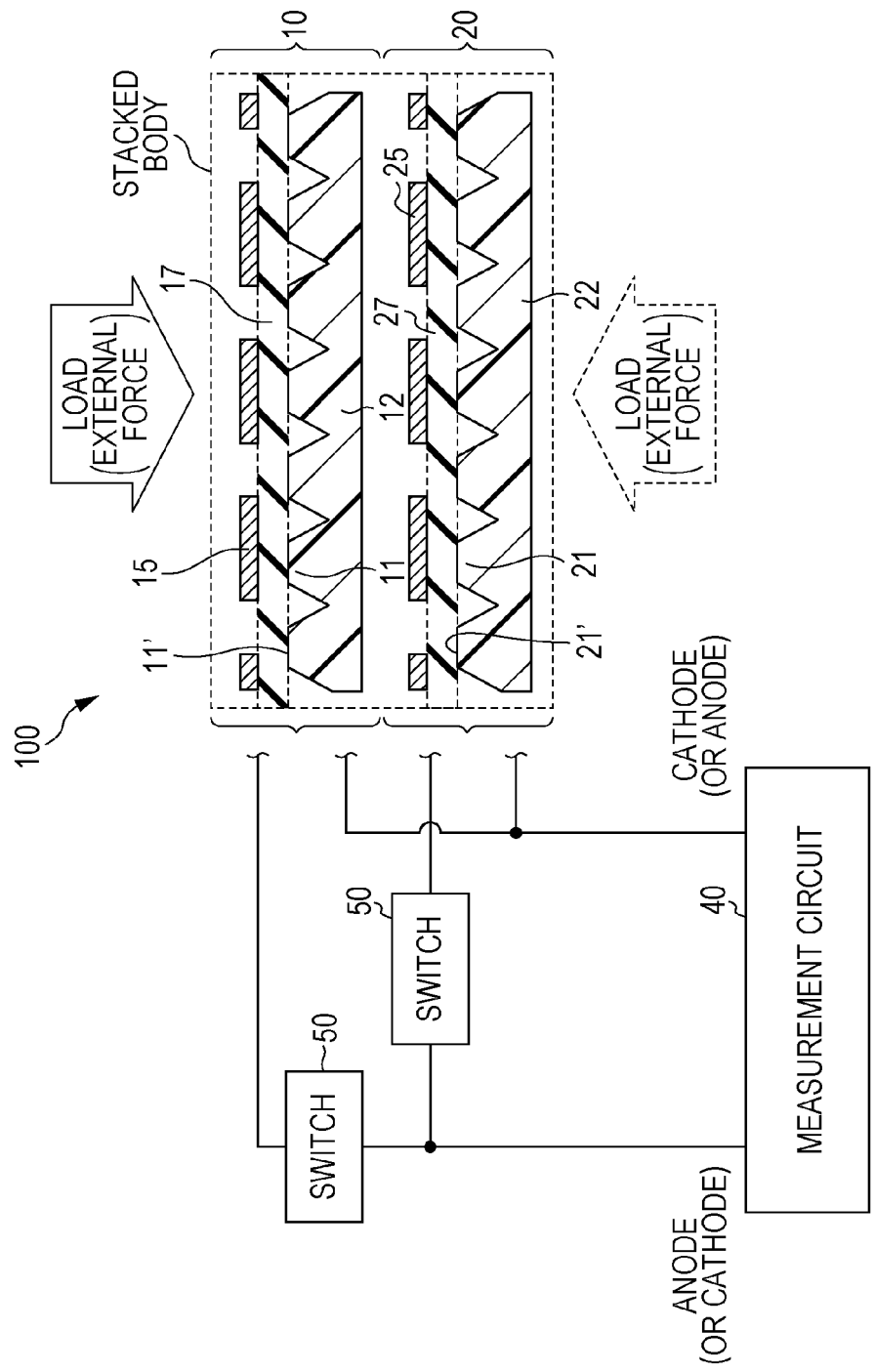
FIG. 1 is a schematic diagram illustrating the configuration of a pressure sensor according to an aspect of the present disclosure.

As a result of detailed discussion, the inventors of the present application have found this time that a pressure sensor in related art has further points to be improved. Specifically, an electrostatic capacitance type pressure sensor to measure load distribution in a plane has a complicated configuration (such as a device structure and/or a circuit configuration) of the sensor and thus the inventors have found some points to be improved.

For instance, the capacitive pressure detection device disclosed in Japanese Unexamined Patent Application Publication No. 01-92632 performs detection with a plane divided into five sections, and each of electrodes is connected to an operational amplifier. In order to obtain the distribution of pressure in the plane with finer resolution, a large number of fine divisions has to be provided. Consequently, a large number of operational amplifiers is needed and thus a large-sized and expensive circuit is needed.

Also, the load distribution detection device disclosed in Japanese Unexamined Patent Application Publication No. 2014-142193 measures a load distribution in a plane by disposing two layers of electrodes and forming the electrodes in a strip shape in mutually perpendicular directions. However, when the capacitance of elements arranged in a matrix form is detected by such a device, it is necessary to perform switching not only at the anode but also at the cathode. Therefore, switches to be connected have to include two types of switches: a "change switch for the anode" and a "change switch for the cathode, thereby resulting in high cost. In addition, a through hole for pulling out an electrode, which is not flush with a terminal, to the terminal has to be formed and the electrode and the terminal have to be electrically connected. Consequently, a semiconductor device and a circuit configuration become complicated, and the load distribution detection device becomes expensive.

The pressure sensor of the present disclosure is capable of measuring load distribution in a plane with a simple configuration without adopting a complicated sensor configuration.

A pressure sensor according to an aspect of the present disclosure includes: a first pressure sensitive element including a first conductive layer including first projections having conductivity, first wiring layers, and a first dielectric layer provided between the first projections and the first wiring layers; and a second pressure sensitive element including a second conductive layer including second projections having conductivity, second wiring layers, and a second dielectric layer provided between the second projections and the second wiring layers. The first pressure sensitive element and the second pressure sensitive element are stacked on each other.

The pressure sensor according to an aspect of the present disclosure may further include: a measurement circuit that includes a cathode terminal and an anode terminal each electrically connected to the first pressure sensitive element and the second pressure sensitive element, and that, in operation, measures electrical capacitances of the first pressure sensitive element and the second pressure sensitive element; and a first electrical switch provided only between one of the cathode terminal and the anode terminal and the first pressure sensitive element; and a second electrical switch provided only between the one of the cathode terminal and the anode terminal and the second pressure sensitive element.

In the pressure sensor according to an aspect of the present disclosure, one of two first wiring layers adjacent to each other out of the first wiring layers may be electrically connected to the cathode terminal while the other of the two first wiring layers adjacent to each other may be electrically connected to the anode terminal, and one of two second wiring layers adjacent to each other out of the second wiring layers may be electrically connected to the cathode terminal while the other of the two second wiring layers adjacent to each other may be electrically connected to the anode terminal.

In the pressure sensor according to an aspect of the present disclosure, the first pressure sensitive element may further include a first common electrode layer that faces the first wiring layers, and the second pressure sensitive element may further include a second common electrode layer that faces the second wiring layers.

The pressure sensor according to an aspect of the present disclosure may further include a measurement circuit that includes a cathode terminal and an anode terminal each electrically connected to the first pressure sensitive element and the second pressure sensitive element, and that measures electrical capacitances of the first pressure sensitive element and the second pressure sensitive element. One of the first wiring layers and the first common electrode layer may be electrically connected to the cathode terminal while the other of the first wiring layers and the first common electrode layer may be electrically connected to the anode terminal, and one of the second wiring layers and the second common electrode layer may be electrically connected to the cathode terminal while the other of the second wiring layers and the second common electrode layer may be electrically connected to the anode terminal.

In the pressure sensor according to an aspect of the present disclosure, the first wiring layers may extend in a first direction, and the second wiring layers may extend in a second direction different from the first direction.

In the pressure sensor according to an aspect of the present disclosure, the first projections and the second projections may be each oriented in the same direction.

In the pressure sensor according to an aspect of the present disclosure, the first projections and the second projections may be respectively oriented in opposite directions.

The pressure sensor according to an aspect of the present disclosure may further include a first wiring substrate and a second wiring substrate, the first wiring layers may be provided in the first wiring substrate, and the second wiring layers may be provided in the second wiring substrate.

In the pressure sensor according to an aspect of the present disclosure, the first dielectric layer may be provided in the first wiring substrate, and the second dielectric layer may be provided in the second wiring substrate.

The pressure sensor according to an aspect of the present disclosure may further include a double-sided wiring substrate having a first principal surface and a second principal surface on opposite side to the first principal surface, one of the first wiring layers and the second wiring layers may be provided in the first principal surface, and the other of the first wiring layers and the second wiring layers may be provided in the second principal surface.

In the pressure sensor according to an aspect of the present disclosure, the double-sided wiring substrate may be positioned between the first conductive layer and the second conductive layer.

The pressure sensor according to an aspect of the present disclosure may further include a support layer disposed between the first pressure sensitive element and the second pressure sensitive element.

[Pressure Sensitive Sensor in Present Disclosure]

Hereinafter, a pressure sensor according to an aspect of the present disclosure will be described with reference to the drawings. It is to be noted that various elements in the drawings are schematically illustrated for the purpose of understanding the present disclosure and the dimension ratio and the external appearance may be different from the actual ones. In addition, the "upward or downward direction" used directly or indirectly in the present description corresponds to the upward or downward direction in the drawings.

FIG. 1 schematically illustrates the configuration of a pressure sensor 100 according to an aspect of the present disclosure. The pressure sensor 100 of the present disclosure includes at least a first pressure sensitive element 10 and a second pressure sensitive element 20. The first pressure sensitive element 10 is formed by having a "first conductive layer 12 including a plurality of first projections 11", a "plurality of first wiring layers 15", and a "first dielectric layer 17 provided between the first projections 11 and the first wiring layers 15". Similarly, the second pressure sensitive element 20 is formed by having a "second conductive layer 22 including a plurality of second projections 21", a "plurality of second wiring layers 25", and a "second dielectric layer 27 provided between the second projections 21 and the second wiring layers 25". The first projections 11 and the second projections 21 have conductivity.

As illustrated, the first pressure sensitive element 10 and the second pressure sensitive element 20 are stacked on each other, and the pressure sensor 100 of the present disclosure is formed by such stacking. In other words, the pressure sensor 100 according to an aspect of the present disclosure has a configuration in which at least two of the same or the same type of pressure sensors are stacked.

The "first conductive layer 12 including a plurality of first projections 11" and the "second conductive layer 22 including a plurality of second projections 21" each have a layer structure in which depressions and projections are alternately arranged. The first conductive layer 12 is disposed to face a plurality of first wiring layers 15. Specifically, the first conductive layer 12 and the plurality of first wiring layers 15 are disposed to face each other with the first dielectric layer 17 interposed therebetween. As illustrated, the first conductive layer 12 and the plurality of first wiring layers 15 are disposed so that the first dielectric layer 17 is interposed between the "uppermost portions 11' of the first projections 11" and the "plurality of first wiring layers 15". Similarly, the second conductive layer 22 is disposed to face the plurality of second wiring layers 25. Specifically, the second conductive layer 22 and the plurality of second wiring layers 25 are disposed to face each other with the second dielectric layer 27 interposed therebetween. In particular, as illustrated, the second conductive layer 22 and the second wiring layers 25 are disposed so that the second dielectric layer 27 is interposed between the "uppermost portions 21' of the second projections 21" and the "second wiring layers 25".

The first projections 11 and the second projections 21 each may have elastic characteristics. In other words, the first projections 11 and the second projections 21 may have such characteristics that the projections are deformed due to an external force and are returned to their original form when the external force is removed. In particular, the projections may have such elastic characteristics that when an external force is applied in the direction in which the pressure sensitive elements are stacked, the area of the uppermost portions (that is, the portions "11'" and "21'") of the first and second projections increases and the projections are returned to their original form when the external force is removed. When the first and second projections have such "elastic characteristics" the first projections 11 and the second projections 21 may be referred to as "first elastic projections" and "second elastic projections", respectively.

The first pressure sensitive element 10 and the second pressure sensitive element 20 each may have a capacitance, and have a condenser function or a capacitor function. In other words, since the first pressure sensitive element 10 and the second pressure sensitive element 20 each includes a conductive layer, a wiring layer, and a dielectric layer therebetween, the elements 10, 20 each may function as a condenser or a capacitor. In such a pressure sensitive element, capacitance change is caused by application of load, then the load is detected by the capacitance change. For instance, as illustrated in FIG. 1, when a load is applied to a pressure sensitive element, capacitance change is caused due to deformation of the first projections 11 and the second projections 21, and thus the load is detected by the capacitance change. Therefore, the pressure sensitive element of the present disclosure may be referred to as an "electrostatic capacitance type pressure sensor element", "capacitive pressure detection sensor element", or "pressure sensitive switching element".

The pressure sensor 100 according to an aspect of the present disclosure includes essentially the same pressure sensor elements such as the first pressure sensitive element 10 and the second pressure sensitive element 20, and has a simple configuration. Even with such a simple configuration, the pressure sensor 100 of the present disclosure is capable of measuring load distribution in a plane. In particular, due to load detection independently performed by the first pressure sensitive element 10 and the second pressure sensitive element 20, it is possible to detect a load position with higher accuracy (that is, to measure load distribution in a plane with higher accuracy).

In addition, in the pressure sensor 100 according to an aspect of the present disclosure, not only the sensor structure itself is simple, but also the circuit configuration for load detection is simple.

As illustrated in FIG. 1, change in capacitance due to application of load may be measured by a "measurement circuit 40". Specifically, the pressure sensor 100 according to an aspect of the present disclosure may have a measurement circuit 40 which is electrically connected to each of the first pressure sensitive element 10 and the second pressure sensitive element 20, and which measures the electrical capacitance of each of the first pressure sensitive element and the second pressure sensitive element. In this case, an electrical switch 50 is provided "in the connection between the measurement circuit 40 and the first pressure sensitive element 10" and "in the connection between the measurement circuit 40 and the second pressure sensitive element 20". In other words, the electrical switch 50 is provided in an electrical connection line for electrically connecting between the measurement circuit 40 and the first pressure sensitive elements 10, and the other electrical switch 50 is also provided in an electrical connection line for electrically connecting between the measurement circuit 40 and the second pressure sensitive elements 20. The "electrical switch" mentioned here is for electrically turning on/off a connection line, and is a switch used for measuring particularly a change in capacitance due to application of load.

In an aspect of the present disclosure, the pressure sensor 100 has the feature that an electrical switch is provided in only one of "line connection connected to the cathode side of the measurement circuit" and "line connection connected to the anode side of the measurement circuit". Specifically, for the electrical connection line between the first pressure sensitive element 10 and the measurement circuit 40, the electrical switch 50 is provided in only one of the "electrical connection line connected to the cathode terminal of the measurement circuit 40" and the "electrical connection line connected to the anode terminal of the measurement circuit 40". In other words, the electrical switch 50 is provided in the "electrical connection line between the first pressure sensitive element 10 and the anode terminal of the measurement circuit 40", but the electrical switch 50 is not provided in the "electrical connection line between the first pressure sensitive element 10 and the cathode terminal of the measurement circuit 40" (see FIG. 1). Alternatively, the electrical switch 50 is provided in the "electrical connection line between the first pressure sensitive element 10 and the cathode terminal of the measurement circuit 40", but the electrical switch 50 is not provided in the "electrical connection line between the first pressure sensitive element 10 and the anode terminal of the measurement circuit 40". Similarly, for the electrical connection line between the second pressure sensitive element 20 and the measurement circuit 40, the electrical switch 50 is provided in only one of the "electrical connection line connected to the cathode terminal of the measurement circuit 40" and the "electrical connection line connected to the anode terminal of the measurement circuit 40". In other words, the electrical switch 50 is provided in the "electrical connection line between the second pressure sensitive element 20 and the anode terminal of the measurement circuit 40", but the electrical switch 50 is not provided in the "electrical connection line between the second pressure sensitive element 20 and the cathode terminal of the measurement circuit 40" (see FIG. 1). Alternatively, the electrical switch 50 is provided in the "electrical connection line between the second pressure sensitive element 20 and the cathode terminal of the measurement circuit 40", but the electrical switch 50 is not provided in the "electrical connection line between the second pressure sensitive element 20 and the anode terminal of the measurement circuit 40".

Thus, the pressure sensor 100 according to an aspect of the present disclosure is capable of measuring load distribution in a plane with higher accuracy, and yet the circuit configuration is relatively simple. In short, although an electrical switch has to be provided in both the anode side and the cathode side in related art, in the present disclosure, it is sufficient that an electrical switch be provided in only one of the anode side and the cathode side. More specifically, in related art, when the capacitance of elements arranged in a matrix form is detected, it is necessary to perform switching not only on the anode side but also on the cathode side, and switches to be connected have to include two types of switches: "change switch for the anode side" and "change switch for the cathode side, whereas in the present disclosure, one type of switch on a single side is sufficient, thereby contributing to a simple circuit configuration.

Hereinafter, the pressure sensitive elements and relevant components of the pressure sensor 100 according to the present disclosure will be described in detail. In other words, the "first conductive layer 12 including the plurality of first projections 11"/the "second conductive layer 22 including the plurality of second projections 21", the "first wiring layers 15"/the "second wiring layers 25", the "first dielectric layer 17"/the "second dielectric layer 27", and other additional components which are included in the first pressure sensitive element 10 and the second pressure sensitive element 20, will be described.

It is to be noted that since the "constituent members of the first pressure sensitive element" and the "constituent members of the second pressure sensitive element" are essentially the same or the same type of members, in order to avoid redundant description, the "constituent members of the first pressure sensitive element" are regarded as representatives and described. In short, the matters described below related to the "constituent members of the first pressure sensitive element", that is, the first projections 11, the first conductive layer 12, the first wiring layers 15, and the first dielectric layer 17 essentially apply to the "constituent members of the second pressure sensitive element", that is, the second projections 21, the second conductive layer 22, the second wiring layers 25, and the second dielectric layer 27.

The first conductive layer 12 is a member that includes at least one first projection 11. Particularly, the first projections 11 may have elastic characteristics (in other words, "such characteristics that the first projection is deformed due to an external force and is returned to its original form when the external force is removed"). In this case, the first projections 11 each correspond to an elastic member. The first conductive layer 12 may have both properties of "elastic characteristics (particularly, the elastic characteristics in the first projections 11)" and "conductive characteristics". The first conductive layer 12 may be composed of a material having either characteristics. For instance, the first conductive layer 12 may be composed of a resin structure and a conductive filler dispersed in the resin structure. The resin structure may be composed of at least one type of resin material selected from the group consisting of a styrene-based resin, a silicone-based resin (for instance, polydimethylpolysiloxane (PDMS)), an acrylic-based resin, a rotaxane-based resin, and an urethane-based resin. On the other hand, the conductive filler may be composed of at least one type of material selected from the group consisting of Au (gold), Ag (silver), Cu (copper), C (carbon), ZnO (zinc oxide), $In_2O_3$ (indium oxide (III)), and $SnO_2$ (tin oxide (IV)). In addition, a conductive surface layer may be used in replacement of or in addition to the conductive filler. Specifically, the first conductive layer 12 may be used, on which a conductive surface layer is provided by application of conductive ink to the surface of a resin structure.

The first projections 11 each have a form that projects from the base portion of the first conductive layer 12 toward the first wiring layers 15 as illustrated in FIG. 1, for instance. In other words, the first conductive layer 12 has a form that includes locally raised projections from the base portion in the direction to the installed "plurality of first wiring layers 15". The number of the first projections 11 in the first conductive layer 12 is at least one. Two or more elastic projections may be provided. In other words, the first conductive layer 12 may have a plurality of first projections 11. Because of the configuration in which the plurality of first projections 11 is provided, the first conductive layer 12 has a form in which depressions and projections are lined, and the projections correspond to the first projections 11.

The elastic modulus of the first conductive layer 12, particularly, the elastic modulus of the first projections 11 may be approximately $10^4$ to $10^8$ Pa so that the first projections 11 are gradually deformed by a normal pressing force (for instance, a pressing force of approximately 1 to 10 N) applied to the pressure sensitive element 10. The elastic modulus is adjustable by changing the relative ratio of the conductive filler to the resin component in the resin structure. Also, the resistivity of the first conductive layer 12 may be sufficiently smaller than the impedance of the capacitance in a desired frequency band. The resistivity is also adjustable by changing the relative ratio of the conductive filler to the resin component in the resin structure.

The first projections 11 each may have a tapered shape. Specifically, each of the first projections 11 of the first conductive layer 12 may have a tapered shape in which the width dimension gradually reduces toward the first wiring layers 15 (see FIG. 1). For instance, the first projection portions 11 may have a frustum shape as a whole, such as a frustum of a cone, a frustum of a rectangular pyramid. Also, in a plan view, the first projection portions 11 may have "point shape (dot shape)" or "ridge shape" when viewed as a whole. Because the first projections 11 each have a tapered shape like this, the first projections 11 are elastically deformed, thereby causing an increase in the contact area between the first projections 11 and the first dielectric layer 17.

The height dimension of the first projections 11 may be any dimension as long as the height dimension contributes to elastic deformation. In other words, the height dimension may be any dimension as long as the first projections 11 are elastically deformed by the pressure from the uppermost portions of the projections. Also, the plurality of first projections 11 may be arranged regularly. No particular restriction is imposed on the pitch dimension of the plurality of first projections 11 as long as the pitch dimension contributes to elastic deformation of the projections and provides a depression between adjacent projections.

The first wiring layers 15, which are disposed to face the first conductive layer 12, are also conductive layers. The first wiring layers 15 may have a form of wiring used for circuit components and circuit elements used in the field of electronics. For instance, the "plurality of first wiring layers 15" may have a form of substrate wiring of the first wiring substrate. The substrate wiring indicates the wiring arranged on a substrate and/or inside a substrate. In other words, a wiring substrate may be used as a component of the pressure sensitive element 10, and the wiring of such a wiring substrate may be used as the "plurality of first wiring layers 15".

The first wiring layers 15 like this may be composed of any material as long as the material has at least the property of "conductive characteristics". For instance, the material for the first wiring layers 15 may be the same as the material for an electrode layer of a commonly used pressure sensitive element, sensor element or the like. The first wiring layers 15 may have an elastic modulus higher than that of the first projections 11, and for instance, has an elastic modulus higher than or equal to $10^8$ Pa. In other words, the first wiring layers 15 may exhibit inelastic characteristics and in that case, the first wiring layers 15 each may be referred to as an inelastic conductive layer.

The first dielectric layer 17 is provided between the first wiring layers 15 and the first conductive layer 12. Particularly, the first dielectric layer 17 is in contact with both the first wiring layers 15 and the uppermost portions 11' of the first projections 11 of the first conductive layer 12, and is positioned therebetween. In other words, the first dielectric layer 17 is provided so as to be interposed between the uppermost portions 11' of the first projections 11 and the first wiring layers 15. More specifically, the first dielectric layer 17 has a form of layer interposed between the "plurality of first projections 11" and the "plurality of first wiring layers 15".

The first dielectric layer 17 may be composed of any material as long as the material has at least the property of "dielectric". For instance, the first dielectric layer 17 may be composed by including a resin material, a ceramic material, a metallic oxide material, a combination of a resin material and a ceramic material, a combination of a resin material and a metallic oxide material, a combination of a ceramic material and a metallic oxide material, or a combination of a resin material, a ceramic material, and a metallic oxide material. The following is for illustrative purposes only, and the first dielectric layer 17 may be composed of at least one type of material selected from the group consisting of a polyimide resin, a polypropylene resin, a poly(ethylene terephthalate) resin, a polyphenylene sulfide resin, $Al_2O_3$ and $Ta_2O_5$.

The first dielectric layer 17 may have stiffness characteristics or may have elastic characteristics (in other words, "such characteristics that the first dielectric layer is deformed due to an external force and is returned to its original form when the external force is removed"). In the case where the first dielectric layer 17 has elastic characteristics, the first dielectric layer 17 may be referred to as an "elastic dielectric layer". In the case where the first dielectric layer 17 is an "elastic dielectric layer", when the pressure sensitive element is pressed, elastic deformation of the first projections 11 of the first conductive layer 12 as well as elastic deformation of the first dielectric layer 17 may be caused. Also, the deformation of both the first dielectric layer 17 and the first conductive layer 12 (particularly, the first projections 11 thereof) in this manner causes deformation of the region between adjacent first projections 11 (in other words, the region corresponding to "further dielectric portion") so that the thickness of the region is reduced and thus a larger capacitance change may be caused.

In an aspect, the first dielectric layer 17 may have an elastic modulus higher than that of the first conductive layer 12 (particularly, the first projections 11) so that the first dielectric layer 17 when pressed is not deformed more than the first conductive layer 12 (particularly, the first projections 11). For instance, in the case where the elastic modulus of the first conductive layer 12 (particularly, the first projections 11) is approximately $10^4$ to $10^8$ Pa, the first dielectric layer 17 may have an elastic modulus higher than that value. The first dielectric layer 17 may include a material which has a resistance value higher than the impedance of the capacitance in a desired frequency band. Regarding the dielectric constant and film thickness of the first dielectric layer 17, selection of material and adjustment of film thickness of the first dielectric layer 17 may be made so that the capacitance change of the pressure sensitive element 10 due to application of load is a desired one.

The first pressure sensitive element 10 includes at least the "first conductive layer 12 including the first projections 11", the "plurality of first wiring layers 15", and the "first dielectric layer 17" as described above, and similarly, the second pressure sensitive element 20 also includes at least the "second conductive layer 22 including the second projections 21", the "plurality of second wiring layers 25", and the "second dielectric layer 27". The second projections 21, the second conductive layer 22, the second wiring layers 25, and the second dielectric layer 27 may be essentially the same or the same type as the first projections 11, the first conductive layer 12, the first wiring layers 15, and the first dielectric layer 17, respectively. In the pressure sensor 100 of the present disclosure, the first pressure sensitive element 10 and the second pressure sensitive element 20, which are considered to be essentially the same or the same type, are stacked on each other in this manner, and the device structure is overall simple. The expression of "are stacked on each other" herein essentially indicates a configuration in which elements independently equipped with a pressure sensing function are provided so as to be stacked in layers. For instance, the first pressure sensitive element 10 and the second pressure sensitive element 20 may be stacked so as to be in contact with each other or may be stacked on each other with an another layer interposed therebetween.

In the pressure sensor 100 according to the present disclosure, the outer surface sides of the first pressure sensitive element 10 and the second pressure sensitive element 20 in a stacked structure may form the pressing side of the pressure sensitive device. As illustrated in FIG. 1, the "first pressure sensitive element side (the upper side of the device in FIG. 1)" and/or the "second pressure sensitive element side (the lower side of the device in FIG. 1)" of the pressure sensor 100 each serve as a pressing side. For instance, when the "first pressure sensitive element side" corresponds to the pressing side, pressing is performed from the outer side to the inner side of such as a device. The first projections 11 and/or the second projections 21, when pressed in such a manner, are deformed with the width dimension gradually increased while the height dimension is decreased, and thus the "contact area between the first projections 11 and the first dielectric layer 17" and/or the "contact area between the second projections 21 and the second dielectric layer 27" increase, and the "region between adjacent first projections 11 (in other words, further dielectric portion of the first pressure sensitive element)" and/or the "region between adjacent second projections 21 (in other words, further dielectric portion of the second pressure sensitive element)" may be deformed so that the thickness is decreased. As a result, change in the electrostatic capacitance occurs in the first pressure sensitive element 10 and/or the second pressure sensitive element 20, and when the change is detected, it is possible to identify a pressed position, that is, a position at which load is applied.

It is to be noted that the pressure sensor 100 according to an aspect of the present disclosure has a configuration in which two pressure sensitive elements, that is, the first pressure sensitive element 10 and the second pressure sensitive element 20 are stacked, and thus "change in electrostatic capacitance due to application of load" may be detected by each device and the accuracy in detecting a load position may be improved. The following is for illustrative purposes only, and for instance, in a two-dimensional plane with X-Y coordinates, the first pressure sensitive element 10 may be used particularly for identification of the position of X coordinate, whereas the second pressure sensitive element 20 may be used particularly for identification of the position of Y coordinate.

Any method may be used for detection of capacitance change as long as the method is capable of detecting capacitance change that occurs in the first pressure sensitive element 10 and the second pressure sensitive element 20. In particular, in the present disclosure, as a configuration for the detection, a configuration may be adopted in which an electrical switch is provided in only one of "line connection connected to the cathode side of the measurement circuit" and "line connection connected to the anode side of the measurement circuit" as illustrated in FIG. 1. In other words, for the electrical connection line between the first pressure sensitive element 10 and the measurement circuit 40, a configuration is adopted in which the electrical switch 50 is provided in only one of the "electrical connection line connected to the cathode terminal of the measurement circuit 40" and the "electrical connection line connected to the anode terminal of the measurement circuit 40". This is also the case with the electrical connection line between the second pressure sensitive element 20 and the measurement circuit 40, and thus a configuration is adopted in which the electrical switch 50 is provided in only one of the "electrical connection line connected to the cathode terminal of the measurement circuit 40" and the "electrical connection line connected to the anode terminal of the measurement circuit 40". The pressure sensor 100 like this is capable of measuring load distribution in a plane with higher accuracy and it is sufficient that an electrical switch for detecting capacitance change be provided in only one of the anode side and the cathode side of the measurement circuit (or detection circuit). Thus, the circuit configuration is overall simple.

The "measurement circuit 40" itself may be a circuit used for detecting capacitance change of a commonly used pressure sensor as long as the measurement circuit 40 includes an anode terminal and a cathode terminal. The measurement circuit of the pressure sensor 100 according to an aspect of the present disclosure may have at least one semiconductor device electrically connected to the electrical switch. Also, a field-effect transistor (FET) may be used as the electrical switch 50, and an integrated circuit such as an analog multiplexer/demultiplexer may be used. In other words, the electrical switch 50 may be a semiconductor device with a built-in metal-oxide-semiconductor field-effect transistor (MOSFET) or a multiplexer and/or demultiplexer, for instance. It is to be noted that the measurement circuit 40 and the electrical switch 50 may use respective different semiconductor devices, or the measurement circuit 40 may be configured to include the electrical switch 50.

The pressure sensor according to the present disclosure may be implemented in various embodiments. Hereinafter, those embodiments will be described.

First Embodiment

Figure 2A:
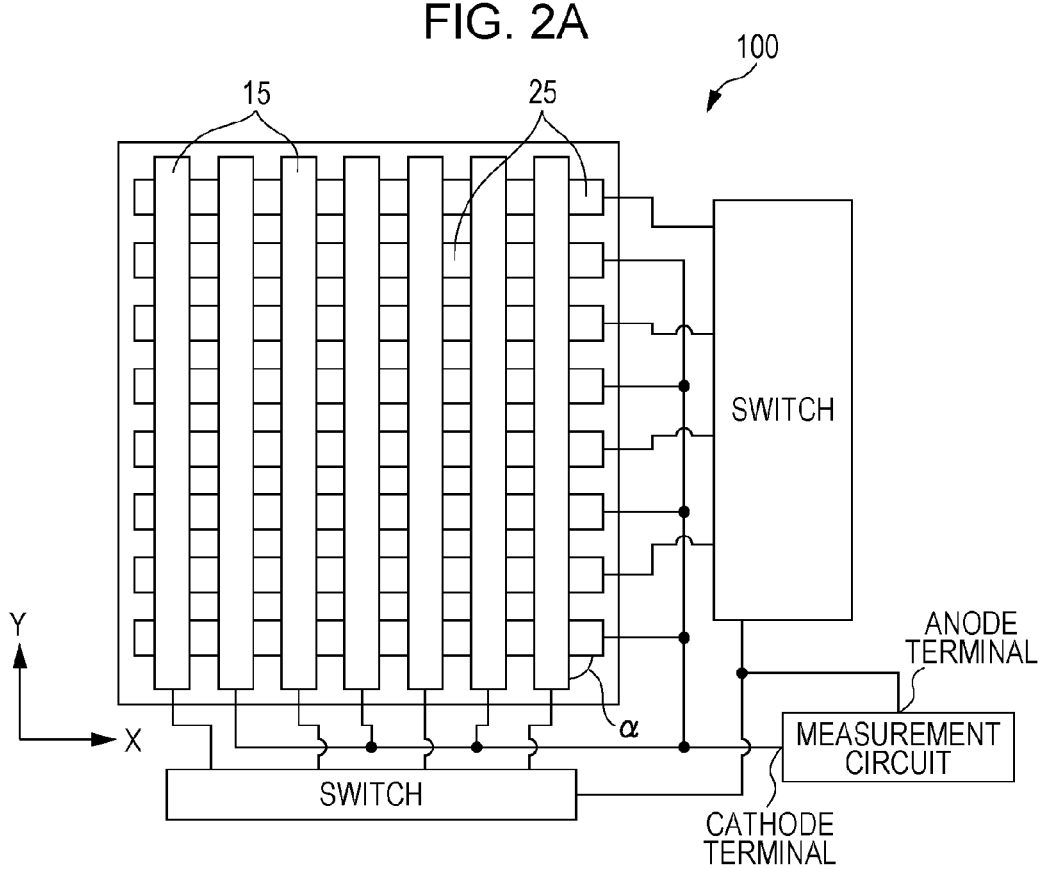
FIG. 2A is a top perspective view schematically illustrating the configuration of a pressure sensor according to a first embodiment of the present disclosure.
Figure 2B:
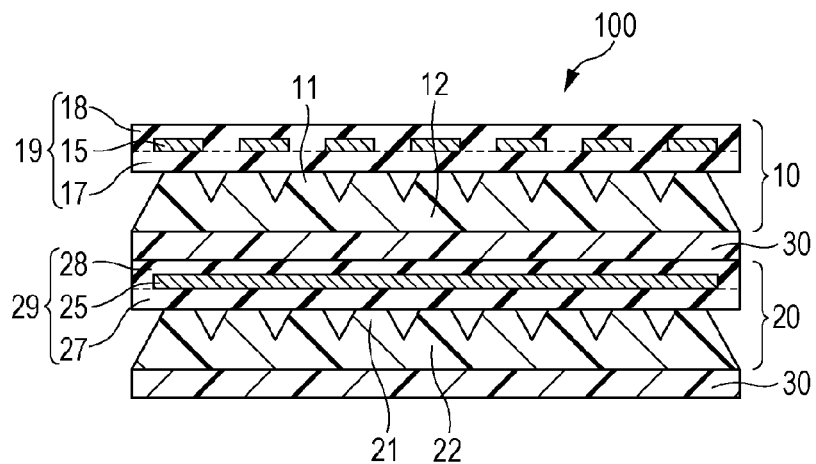
FIG. 2B is a sectional view schematically illustrating the configuration of the pressure sensor according to the first embodiment of the present disclosure.
Figure 2C:
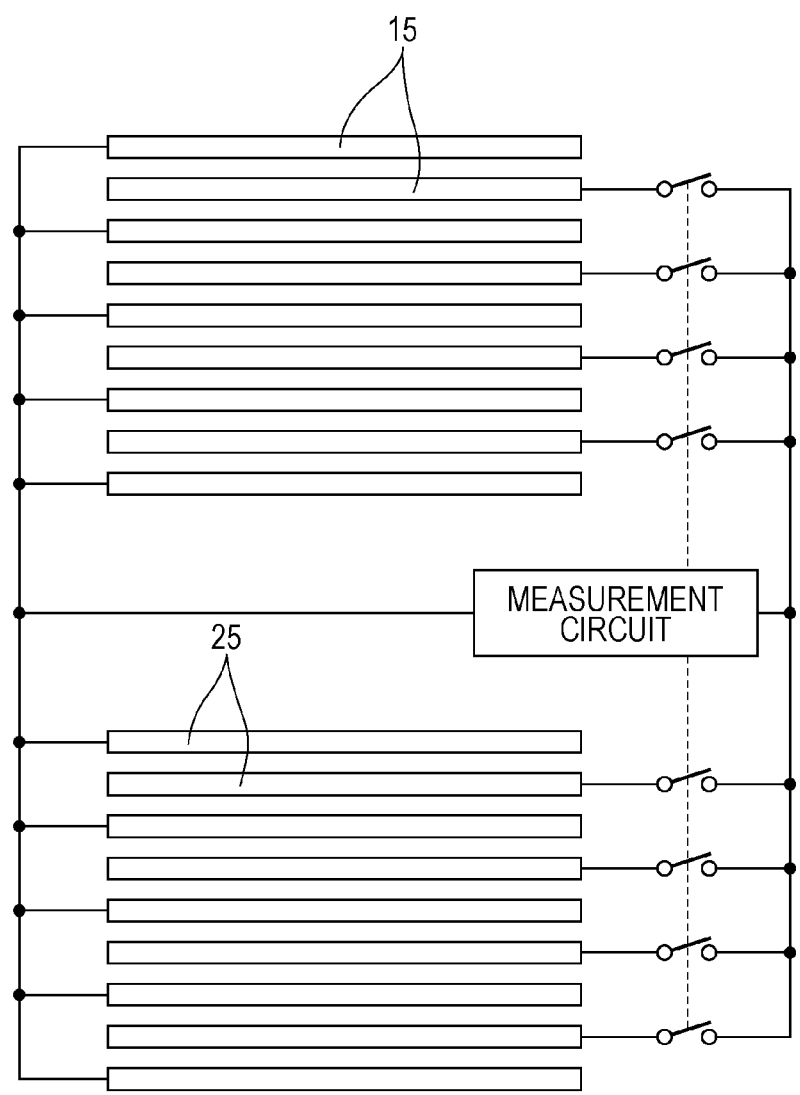
FIG. 2C is a schematic diagram illustrating the circuit configuration of the pressure sensor according to the first embodiment of the present disclosure.

The pressure sensor 100 according to a first embodiment of the present disclosure is illustrated in FIGS. 2A to 2C. FIGS. 2A to 2C schematically illustrate a top perspective view, a sectional view, and a circuit configuration of the pressure sensor 100, respectively.

The pressure sensor 100 according to the first embodiment has a configuration in which a "first pressure sensitive element 10 including at least a first conductive layer 12 including a plurality of first projections 11, a plurality of first wiring layers 15, a first dielectric layer 17, and a support layer 30" and a "second pressure sensitive element 20 including at least a second conductive layer 22 including a plurality of second projections 21, a plurality of second wiring layers 25, a second dielectric layer 27, and a support layer 30" are stacked. As seen from the illustrated embodiment, the pressure sensor 100 has a configuration in which two same or same type pressure sensitive elements (that is, the "pressure sensitive element 10" and the "pressure sensitive element 20") are stacked.

In the first embodiment, the first wiring layers 15 serve as the substrate wiring of a first wiring substrate 19, whereas the second wiring layers 25 serve as the substrate wiring of a second wiring substrate 29. In other words, the pressure sensor 100 in the first embodiment is formed by having the first wiring substrate 19 and the second wiring substrate 29, and the substrate wiring of the first wiring substrate 19 forms the first wiring layers 15, whereas the substrate wiring of the second wiring substrate 29 forms the second wiring layers 25. In this case, the insulation layer portion of the wiring substrate may serve as the dielectric layer of the pressure sensitive element. Specifically, at least a portion 17 of the insulation portion of the first wiring substrate 19 may serve as the first dielectric layer, whereas at least a portion 27 of the insulation portion of the second wiring substrate 29 may serve as the second dielectric layer. In the illustrated embodiment, when the first wiring substrate 19 includes two sub insulation layers (17, 18) and the first wiring layers 15 interposed therebetween, the lower sub insulation layer 17 corresponds to the first dielectric layer. Similarly, when the second wiring substrate 29 includes two sub insulation layers (27, 28) and the second wiring layers 25 interposed therebetween, the lower sub insulation layer 27 corresponds to the second dielectric layer.

As illustrated, the pressure sensor 100 according to the first embodiment is formed by further having support layers 30. The support layers 30 are used "to support" the pressure sensitive elements of the pressure sensor 100. As seen from the illustrated embodiment, each of the support layers 30 may serve as a layer included in the stacked structure of the pressure sensor. In this manner, each support layer 30 serves as a "layer included in the stacked structure", and thus the device including the first pressure sensitive element 10 and the second pressure sensitive element 20 may be integrated as a whole. It is to be noted that when the support layer 30 has sufficient strength, only one support layer may be provided in the entire device.

In the first embodiment, both the first wiring layers 15 of the first pressure sensitive element 10 and the second wiring layers 25 of the second pressure sensitive element 20 extend along the longer dimension in a predetermined direction. Specifically, as illustrated in FIG. 2A particularly, the plurality of first wiring layers 15 is each provided to extend in an elongated shape, and is arranged with a predetermined pitch interval. Similarly, the plurality of second wiring layers 25 is also each provided to extend in an elongated shape, and is arranged with a predetermined pitch interval. In other words, the "plurality of first wiring layers 15" and the "plurality of second wiring layers 25" formed on different planes are each provided to extend in a single direction in the same plane. As seen from the illustrated embodiment, in the first embodiment, the extending direction of the first wiring layers 15 and the extending direction of the second wiring layers 25 are different from each other. In other words, although the first wiring layers 15 and the second wiring layers 25 each extend in a predetermined plane, the extending directions are different from each other. Specifically, as illustrated in FIG. 2A, the plurality of first wiring layers 15 is arranged so as to extend in the Y direction, whereas the plurality of second wiring layers 25 is arranged so as to extend in the X direction. When load detection is independently performed using the first pressure sensitive element 10 and the second pressure sensitive element 20 having the first wiring layers 15 and the second wiring layers 25 with different extending directions in this manner, it is possible to detect a load position with higher accuracy (that is, to measure load distribution in a plane with higher accuracy).

The angle ("α" indicated in FIG. 2A) formed by the extending directions of the "plurality of first wiring layers 15" and the "plurality of second wiring layers 25" provided on different planes is approximately 90° in the illustrated embodiment but is not necessarily limited to approximately 90°. The angle α formed by the extending directions of the "plurality of first wiring layers 15" and the "plurality of second wiring layers 25" may be in a range of 20° to 90°, and may be, for instance, approximately 30° or approximately 60°.

Each of the first pressure sensitive element 10 and the second pressure sensitive element 20 is configured to be electrically connected to the measurement circuit. The measurement circuit is a circuit for measuring the capacitance of those pressure sensitive elements, and may include at least a semiconductor device including a measurement terminal on the anode side and a measurement terminal on the cathode side.

In the first embodiment, a plurality of wiring layers of the first pressure sensitive element 10 and the second pressure sensitive element 20 is alternately connected to a common terminal of the measurement circuit via the electrical switch. Regarding to this, for instance, in the case where the measurement circuit is formed by having at least one semiconductor device electrically connected to the electrical switch, in each of the first pressure sensitive element 10 and the second pressure sensitive element 20, the plurality of wiring layers may be alternately connected to the common terminal of the semiconductor device.

In the first embodiment, the plurality of wiring layers 15 of the first pressure sensitive element 10 is alternately connected to the anode terminal of the measurement circuit via the electrical switch, whereas other wiring layers are electrically connected to the cathode terminal of the measurement circuit not via the electrical switch. Similarly, the plurality of wiring layers 25 of the second pressure sensitive element 20 is alternately connected to the anode terminal of the measurement circuit via the electrical switch, whereas other wiring layers are electrically connected to the cathode terminal of the measurement circuit not via the electrical switch. When described in a summarized manner from another viewpoint, one of layers adjacent to each other out of the plurality of first wiring layers 15 is electrically connected to the cathode terminal of the measurement circuit, whereas the other of the layers adjacent to each other is electrically connected to the anode terminal of the measurement circuit, and one of layers adjacent to each other out of the plurality of second wiring layers 25 is electrically connected to the cathode terminal of the measurement circuit, whereas the other of the layers adjacent to each other is electrically connected to the anode terminal of the measurement circuit.

In the illustrated embodiment, the electrical switch 50 is provided in the "electrical connection line between the first pressure sensitive element 10 and the anode terminal of the measurement circuit 40", whereas the electrical switch 50 is not provided in the "electrical connection line between the first pressure sensitive element 10 and the cathode terminal of the measurement circuit 40". Similarly, the electrical switch 50 is provided in the "electrical connection line between the second pressure sensitive element 20 and the anode terminal of the measurement circuit 40", whereas the electrical switch 50 is not provided in the "electrical connection line between the second pressure sensitive element 20 and the cathode terminal of the measurement circuit 40". It is to be noted that when the electrical switch 50 includes a semiconductor device, one of the terminals may be connected to the wiring layers and the other of the terminals may be connected to the anode terminal of the measurement circuit.

When a pressure is applied from the outside to the pressure sensor 100 according to the first embodiment, in the first pressure sensitive element 10, a capacitance formed between the first wiring layers 15 and the first conductive layer 12 is increased due to deformation of the first projections 11, capacitance change between the anode and the cathode is detected, and a position at which the pressure is applied is measured. Particularly, in the first embodiment, capacitance change in series between a "wiring layer 15 connected to the anode side" and the "adjacent wiring layer 15 connected to the cathode side" may be detected. Similarly, in the first pressure sensitive element 20 also, a capacitance formed between the second wiring layers 25 and the second conductive layer 22 is increased due to deformation of the second projections 21, capacitance change between the anode and the cathode is detected, and a pressure-applied position is measured.

In the pressure sensor 100 according to the first embodiment, since the extending directions of the wiring layer are different between the "upper wiring layer, the electrical switch, and the measurement circuit" (that is, the first pressure sensitive element 10) and the "lower wiring layer, the electrical switch, and the measurement circuit" (that is, the second pressure sensitive element 20), measurement of respective capacitance changes allows a pressure-applied position (in other words, a load-applied position) to be identified. As a remark, when a load-applied position is detected, switching processing is performed in an extremely short time so that one of the plurality of electrical switches of the pressure sensitive elements as illustrated is selectively set "ON" (other switches are set "OFF"), thereby making it possible to identify the location where capacitance change occurs.

In this manner, a load-applied position may be identified in the present disclosure, and yet the circuit configuration for measuring a capacitance change of the sensor device is relatively simple. Specifically, no electrical switch is interposed between the cathode terminal of the measurement circuit and the wiring layers 15, 25, and the same circuit configuration is applicable between the "upper wiring layer, the electrical switch, and the measurement circuit" and the "lower wiring layer, the electrical switch, and the measurement circuit". Thus it is possible to measure pressure distribution in a plane with a simple circuit configuration of the entire device.

The following is for illustrative purposes only, and capacitance measurement was conducted based on the concrete specification for device described below in accordance with the first embodiment. As a result, a capacitance of approximately 3 pF was observed with no pressure applied, and a capacitance of approximately 7 pF was observed with pressure of approximately $2 \times 10^4$ Pa applied.

The size of the pressure sensor according to the present embodiment has a length of approximately 10 cm and a width of approximately 10 cm. As the support layer 30, an insulating resin film with a thickness of approximately 300 μm, a length of approximately 10 cm, and a width of approximately 10 cm was used.

The first conductive layer 12 and the second conductive layer 22 are each a conductive layer in which a plurality of projections having a height of approximately 30 μm and a base diameter of approximately 100 μm is formed. The first conductive layer 12 and the second conductive layer 22 each have dimensions of a thickness of approximately 100 μm, a length of 10 cm, and a width of 10 cm. The first conductive layer 12 and the second conductive layer 22 are each a layer including a resin structure and a conductive filler present in the resin structure.

The first wiring substrate 19 and the second wiring substrate 29 are each a wiring substrate with a thickness of 150 μm and length/width dimension of 12 cm, in which a plurality of wiring layers with a thickness of 6 μm is formed. The first wiring substrate 19 and the second wiring substrate 29 each include a lead-out portion in part. As the sub insulation layers 17, 18, 27, 28 included in the first wiring substrate 19 and the second wiring substrate 29, a polyimide film with a thickness of approximately 60 μm and length/width dimension of approximately 10 cm is used. Copper wiring layers, which are interposed between two pieces of such a polyimide film, are provided in a strip shape with a width of approximately 5 mm and a length of approximately 10 cm in one direction except for the lead-out portion.

It is to be noted that the above-mentioned specific matters are for illustrative purposes only and may be modified as needed. Specifically, in the above illustration, the support body has a thickness of 300 μm, the conductive layer has a thickness of 100 μm, the polyimide film has a thickness of 60 μm, and the wiring layer has a width of 5 mm and a length of 10 cm. However, the physical length such as the thickness, length, width and the relative permittivity of each layer may be properly selected so that capacitance change of 2 to 1000 pF is obtained in a desired range of applied pressure, and desired pressure sensor characteristics are thereby obtained.

For instance, when an insulating resin film is used as the support layer 30, various resins such as a polyimide film and a PET film may be used as the material for the insulating resin film. Furthermore, the support layer 30 is not necessarily a film form and may be a member that allows bending which causes the projections to be deformed in response to a desired stress, and so the support layer 30 may be a thin plate of glass or an acrylic plate, or a conductive plate may be used, such as a stainless plate and an aluminum plate on which an insulating resin is coated or applied. More specifically, the support layer 30 does not necessarily exhibit insulation properties as long as no short circuit undesirably occurs between wiring, and a stainless plate or an aluminum plate may be used as the support layer.

Although a wiring layer including copper sandwiched between polyimide films has been illustrated as a wiring substrate, such a wiring substrate may be any type of wiring plate as long as the wiring plate includes an insulator and a conductor. In this case, FR-4 or a liquid crystal polymer composed of glass composite epoxy resin may be used which is often used as an insulator for a wiring plate, and a polypropylene resin, a poly(ethylene terephthalate) resin, a polyimide resin, or a polyphenylene sulfide resin may be used as an insulating resin. Also, alumina or tantalum oxide, a ceramic resin may be used as needed. On the other hand, any material exhibiting conductivity is sufficient for the conductor for a wiring substrate, and for instance, a conductor including aluminum or silver is sufficient. Since the insulator portion positioned between wiring layers and conductive layers forms a capacitance, a thin material with a high relative permittivity may be used, and accordingly, the capacitance is increased and thus detection of capacitance change performed by the measurement circuit may be improved.

In addition, the plurality of wiring layers of the first pressure sensitive element 10 and the second pressure sensitive element 20 may be connected to a common terminal of the measurement circuit via an electrical switch every third layer. More specifically, for instance, the plurality of wiring layers 15 of the first pressure sensitive element 10 may be electrically connected to the anode terminal of the measurement circuit via an electrical switch every third layer, and other wiring layers may be electrically connected to the cathode terminal of the measurement circuit not via an electrical switch. This is also the case with the plurality of wiring layers 25 of the second pressure sensitive element 20. Even in such an embodiment, it is possible to measure capacitance change which is an increase due to deformation of the first projections, and a position to which pressure is applied (that is, a load-applied position) may be identified in a plane. It is to be noted that even in this embodiment, the following is achieved: one of layers adjacent to each other out of the plurality of first wiring layers 15 is electrically connected to the cathode terminal of the measurement circuit, whereas the other of the layers adjacent to each other is electrically connected to the anode terminal of the measurement circuit, and one of layers adjacent to each other out of the plurality of second wiring layers 25 is electrically connected to the cathode terminal of the measurement circuit, whereas the other of the layers adjacent to each other is electrically connected to the anode terminal of the measurement circuit. In other words, the expression "adjacent to each other" in the present disclosure includes not only the case where referred wiring layers are directly adjacent to each other without non-referred wiring layer interposed therebetween, but also the case where referred wiring layers are indirectly adjacent to each other with other wiring layer (for instance, one non-referred wiring layer) interposed between the referred wiring layers.

Second Embodiment

Figure 3A:
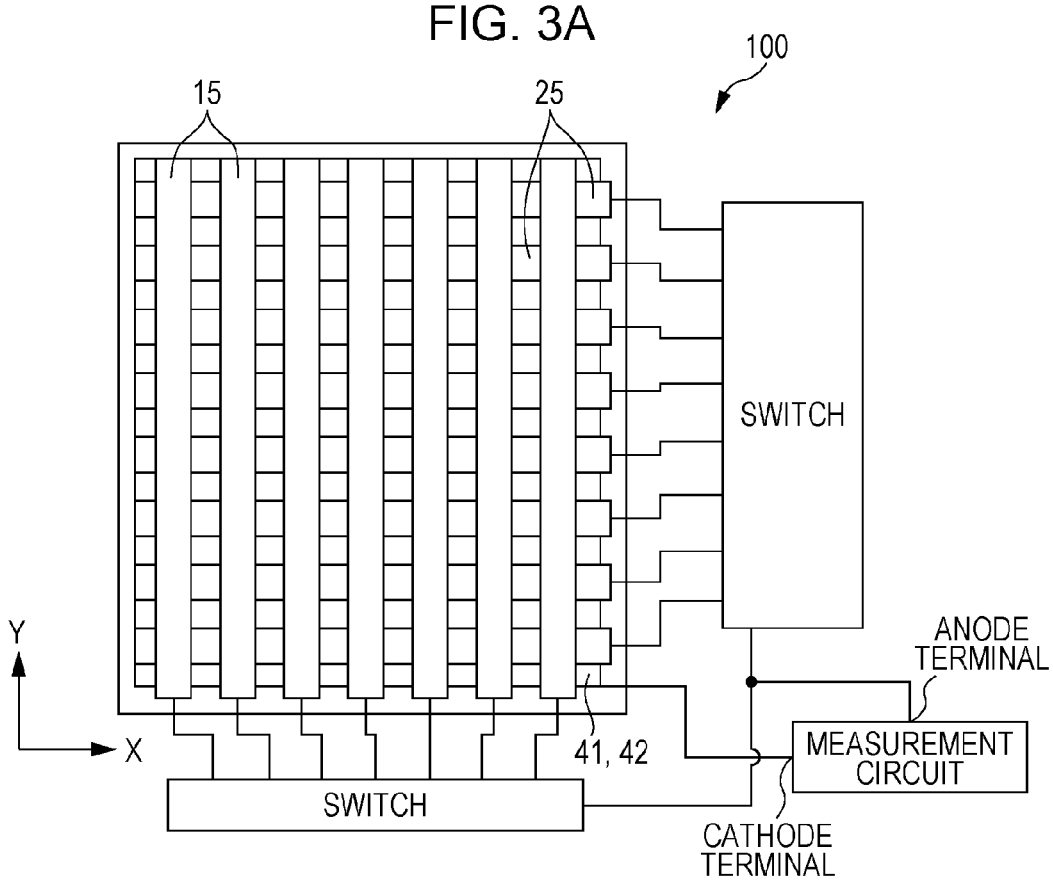
FIG. 3A is a top perspective view schematically illustrating the configuration of a pressure sensor according to a second embodiment of the present disclosure.
Figure 3B:
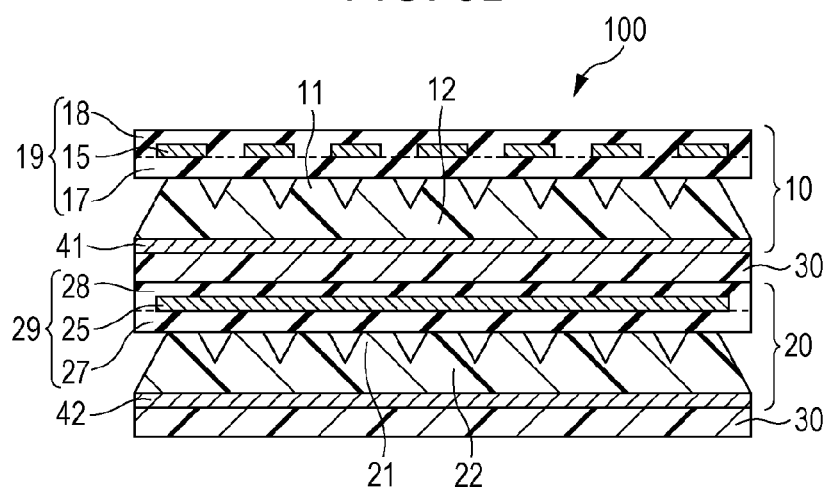
FIG. 3B is a sectional view schematically illustrating the configuration of the pressure sensor according to the second embodiment of the present disclosure.
Figure 7:
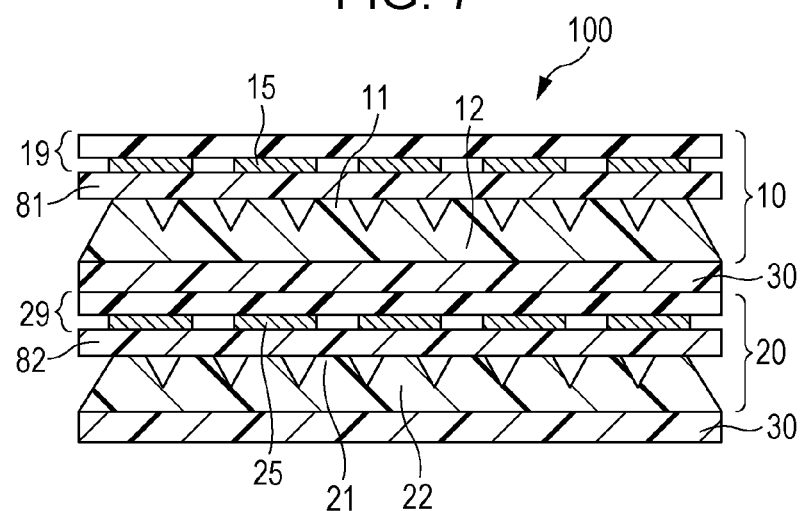
FIG. 7 is a schematic sectional view illustrating a modification of the stacked configuration of the pressure sensor according to an aspect of the present disclosure.
Figure 8:
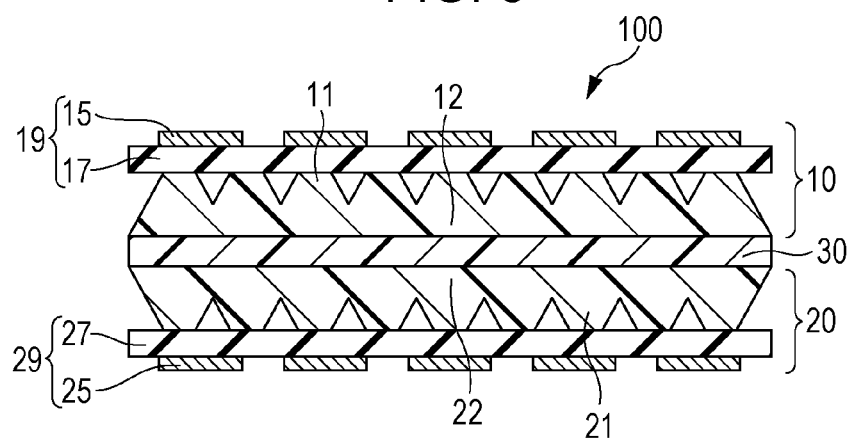
FIG. 8 is a schematic sectional view illustrating a modification of the stacked configuration of the pressure sensor according to an aspect of the present disclosure.
Figure 9:
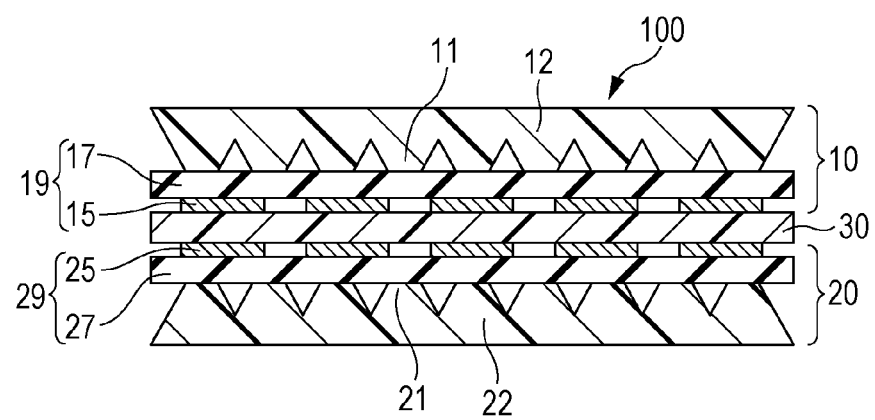
FIG. 9 is a schematic sectional view illustrating a modification of the stacked configuration of the pressure sensor according to an aspect of the present disclosure.
Figure 10:
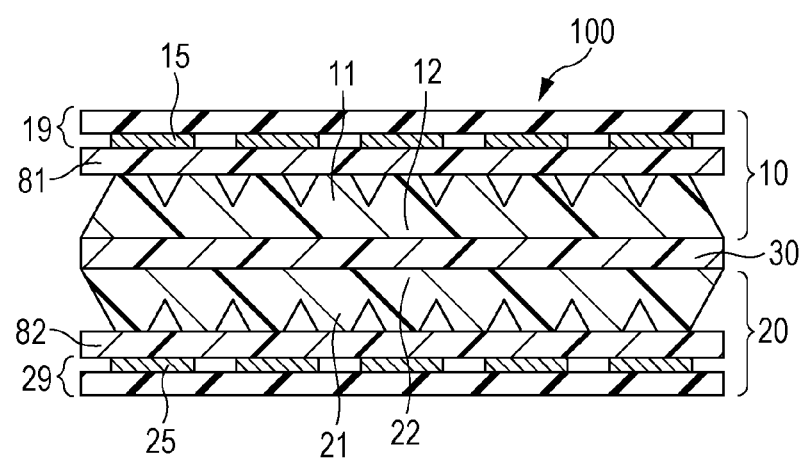
FIG. 10 is a schematic sectional view illustrating a modification of the stacked configuration of the pressure sensor according to an aspect of the present disclosure.
Figure 11:
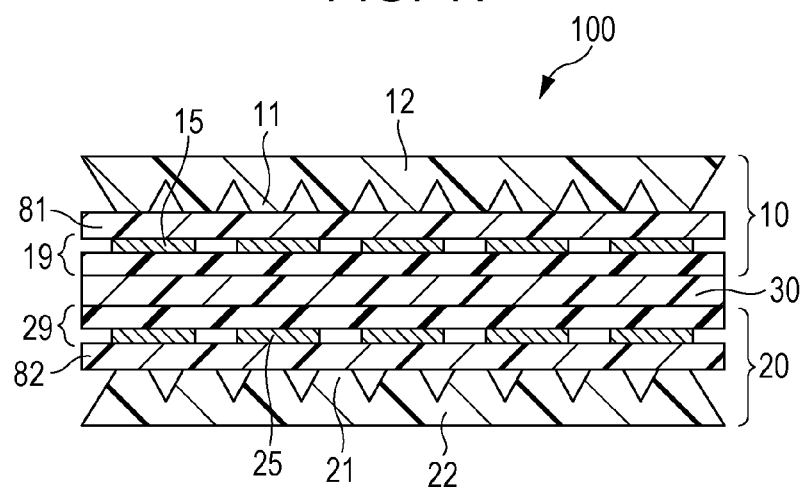
FIG. 11 is a schematic sectional view illustrating a modification of the stacked configuration of the pressure sensor according to an aspect of the present disclosure.

The pressure sensor 100 according to a second embodiment of the present disclosure is illustrated in FIGS. 3A to 3C. FIGS. 3A to 3C schematically illustrate a top perspective view, a sectional view, and a circuit configuration of the pressure sensor 100, respectively.

Similarly to the first embodiment, the pressure sensor 100 according to the second embodiment also has the configuration in which two same or same type pressure sensitive elements (that is, the "pressure sensitive element 10" and the "pressure sensitive element 20") are stacked. Particularly, the pressure sensor 100 according to the second embodiment has what is called a "common electrode".

The "common electrode" is provided to face the wiring layers of each pressure sensitive element in the pressure sensor 100. Specifically, the first pressure sensitive element 10 has a first common electrode layer 41 which is provided to face the plurality of first wiring layers 15, and the second pressure sensitive element 20 has a second common electrode layer 42 which is provided to face the plurality of second wiring layers 25 (see particularly FIG. 3B). As seen from the illustrated embodiment, the first common electrode layer 41 may be provided on the "principal surface opposite to the projection-formed surface of the first conductive layer 12" and the second common electrode layer 42 may be provided on the "principal surface opposite to the projection-formed surface of the second conductive layer 22".

In this embodiment, one of the first wiring layers 15 and the first common electrode layer 41 is electrically connected to the cathode side of the measurement circuit, whereas the other of the first wiring layers 15 and the first common electrode layer 41 is electrically connected to the anode side of the measurement circuit. Similarly, one of the second wiring layers 25 and the second common electrode layer 42 is electrically connected to the cathode side of the measurement circuit, whereas the other of the second wiring layers 25 and the second common electrode layer 42 is electrically connected to the anode side of the measurement circuit. In the illustrated embodiment, the first wiring layer 15 of the first pressure sensitive element 10 is connected to the anode of the measurement circuit via an electrical switch, whereas the first common electrode layer 41 of the first pressure sensitive element 10 is connected to the cathode of the measurement circuit not via an electrical switch. Similarly, in the illustrated embodiment, the second wiring layer 25 of the second pressure sensitive element 20 is connected to the anode of the measurement circuit via an electrical switch, whereas the second common electrode layer 42 of the second pressure sensitive element 20 is connected to the cathode of the measurement circuit not via an electrical switch. In other words, in the illustrated embodiment, the respective common electrode layers 41, 42 of the first and second pressure sensitive elements 10, 20 are connected to the cathode terminal of the measurement circuit not via an electrical switch, whereas the first wiring layers 15 and the second wiring layers 25 of those pressure sensitive elements are connected to the anode terminal of the measurement circuit via an electrical switch.

When a pressure is applied from the outside to the pressure sensor 100 according to the second embodiment, in the first pressure sensitive element 10, a capacitance formed between the first wiring layers 15 and the first conductive layer 12 is increased due to deformation of the first projections 11, capacitance change between the anode and the cathode is detected, and a pressure-applied position is measured. Similarly, in also the first pressure sensitive element 20, a capacitance formed between the second wiring layers 25 and the second conductive layer 22 is increased due to deformation of the second projections 21, capacitance change between the anode and the cathode is detected, and a pressure-applied position is measured. Similarly to the first embodiment, also in the second embodiment, since the extending directions of the wiring layer are different between the "upper wiring layer, the electrical switch, and the measurement circuit" (that is, the first pressure sensitive element 10) and the "lower wiring layer, the electrical switch, and the measurement circuit" (that is, the second pressure sensitive element 20), measurement of respective capacitance changes allows a pressure-applied position (in other words, a load-applied position) to be identified. In this manner, a load-applied position may be identified, and yet the circuit configuration for measuring a capacitance change of the sensor device is simple. Specifically, no electrical switch is interposed between the cathode terminal of the measurement circuit and the common electrode layers 41, 42, and the same circuit configuration is applicable between the "upper wiring layer, the electrical switch, and the measurement circuit" and the "lower wiring layer, the electrical switch, and the measurement circuit". Thus it is possible to measure pressure distribution in a plane with a simple circuit configuration of the entire device.

In the second embodiment, a device particularly having an excellent shielding effect is achievable. Specifically, at least one of the first common electrode layer 41 and the second common electrode layer 42 may be used as a shield layer. Specifically, at least one of the first common electrode layer 41 and the second common electrode layer 42 may be used as a layer having a shielding function for blocking electromagnetic and/or electrostatic interference (noise) from the outside. Consequently, it is possible to detect a load position with higher accuracy (that is, to measure load distribution in a plane with higher accuracy).

Other matters of the second embodiment are the same as those of the first embodiment, and thus description thereof is omitted to avoid redundancy.

The following is for illustrative purposes only, and capacitance measurement was conducted based on the concrete specification for device described below in accordance with the second embodiment. As a result, a capacitance of approximately 3 pF was observed with no pressure applied, and a capacitance of approximately 7 pF was observed with pressure of approximately $2 \times 10^4$ Pa applied.

The size of the pressure sensor according to the present embodiment has a length of approximately 10 cm and a width of approximately 10 cm. A copper foil having a thickness of approximately 18 µm was used as the first common electrode layer 41 and the second common electrode layer 42. As the support layer 30, an insulating resin film with a thickness of approximately 300 µm, a length of approximately 10 cm, and a width of approximately 10 cm was used.

The first conductive layer 12 and the second conductive layer 22 are each a conductive layer in which a plurality of projections having a height of approximately 30 µm and a base diameter of approximately 100 µm is formed. The first conductive layer 12 and the second conductive layer 22 each have dimensions of a thickness of approximately 100 µm, a length of 10 cm, and a width of 10 cm. The first conductive layer 12 and the second conductive layer 22 are each a layer including a resin structure and a conductive filler present in the resin structure.

The first wiring substrate 19 and the second wiring substrate 29 are each a wiring substrate with a thickness of 150 µm and length/width dimension of 12 cm, in which a plurality of wiring layers with a thickness of 6 µm is formed. The first wiring substrate 19 and the second wiring substrate 29 each include a lead-out portion in part. As the sub insulation layers 17, 18, 27, 28 included in the first wiring substrate 19 and the second wiring substrate 29, a polyimide film with a thickness of approximately 60 µm and length/width dimension of approximately 12 cm is used. Copper wiring layers, which are interposed between two pieces of such a polyimide film, are provided in a strip shape with a width of approximately 5 mm and a length of approximately 10 cm in one direction except for the lead-out portion.

(Various Stacked Configurations)

Various stacked configurations of the pressure sensor 100 according to the present disclosure may be devised. Those various stacked configurations are illustrated in FIGS. 4 to 16.

As seen from the configurations illustrated in FIGS. 4 to 16, the respective conductive layers of the first pressure sensitive element 10 and the second pressure sensitive element 20 may be "in the same direction", "in the inward direction of the device", or "in the outward direction of the device". Specifically, the first conductive layer 12 and the second conductive layer 22 may be provided so that the first projections 11 and the second projections 21 are "each oriented in the same direction", "each oriented in the inward direction", or "each oriented in the outward direction".

In the pressure sensor 100 illustrated in FIGS. 4 to 7, 14, the first conductive layer 12 and the second conductive layer 22 are provided so that the first projections 11 and the second projections 21 are "each oriented in the same direction". In the pressure sensor 100 illustrated in FIGS. 9, 11 to 13, and 16, the first conductive layer 12 and the second conductive layer 22 are provided so that the first projections 11 and the second projections 21 are "each oriented in the inward direction". In the pressure sensor 100 illustrated in FIGS. 8, 10, and 15, the first conductive layer 12 and the second conductive layer 22 are provided so that the first projections 11 and the second projections 21 are "each oriented in the outward direction".

Figure 12:
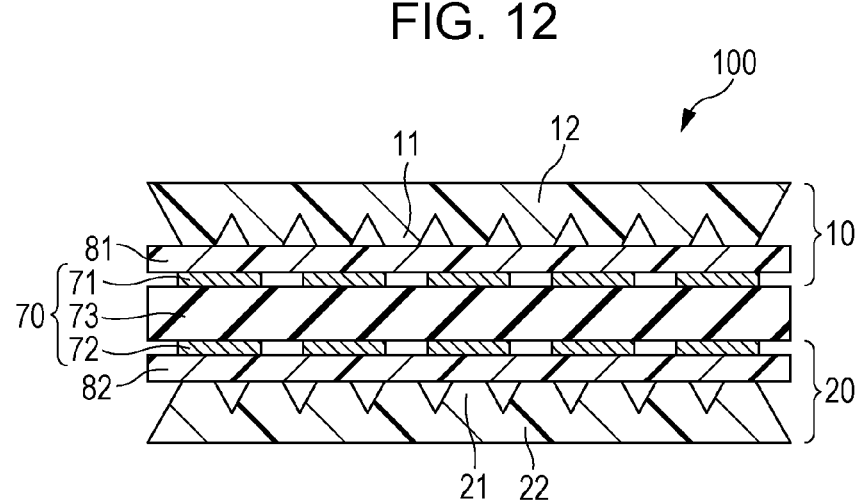
FIG. 12 is a schematic sectional view illustrating a modification of the stacked configuration of the pressure sensor according to an aspect of the present disclosure.
Figure 13:
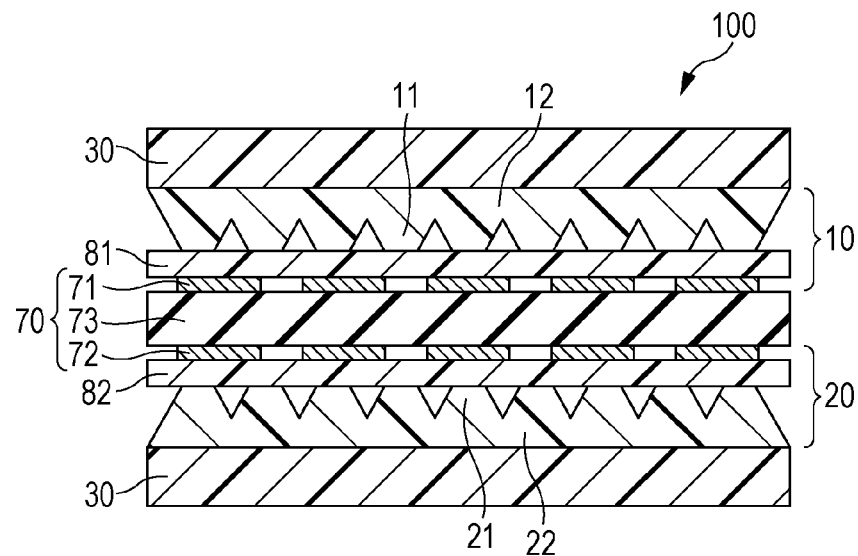
FIG. 13 is a schematic sectional view illustrating a modification of the stacked configuration of the pressure sensor according to an aspect of the present disclosure.
Figure 16:
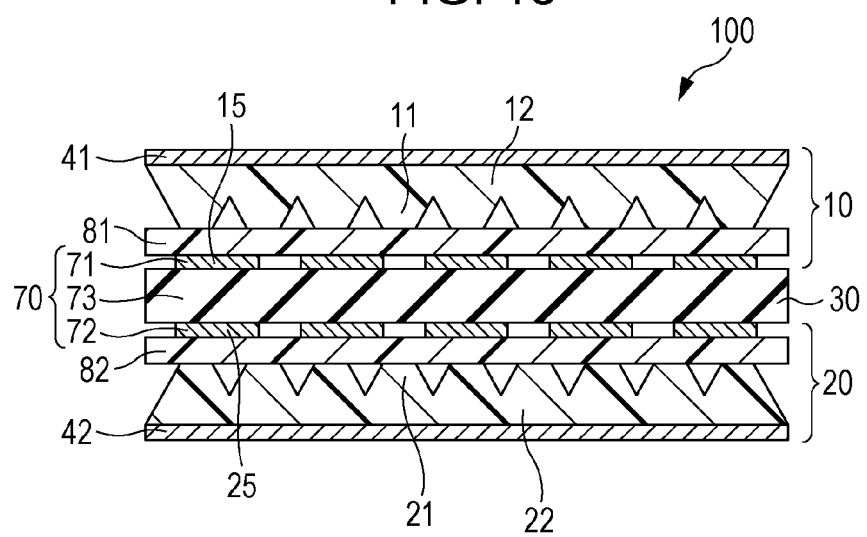
FIG. 16 is a schematic sectional view illustrating a modification of the stacked configuration of the pressure sensor according to an aspect of the present disclosure.

As illustrated in FIGS. 12, 13, and 16, a double-sided wiring substrate 70 may be used for the stacked structure of the pressure sensor 100. In this case, for instance, upper wiring layers 71 of the double-sided wiring substrate 70 may be used as the wiring layers of the first pressure sensitive element 10, and lower wiring layers 72 of the double-sided wiring substrate 70 may be used as the wiring layers of the second pressure sensitive element 20. In other words, the pressure sensor 100 illustrated in FIGS. 12, 13, and 16 is formed by having the double-sided wiring substrate 70, and one set of the first wiring layers 15 and the second wiring layers 25 serves as the wiring provided on one principal surface of the double-sided wiring substrate 70, and the other set of the first wiring layers 15 and the second wiring layers 25 serves as the wiring provided on the other principal surface of the double-sided wiring substrate 70.

In a configuration that uses the double-sided wiring substrate 70, the pressure sensor 100 may be implemented using the single wiring substrate and thus, in this respect, a simpler device configuration is achievable. In a configuration that uses the double-sided wiring substrate 70 like this, the double-sided wiring substrate 70 may be positioned between the first conductive layer 12 and the second conductive layer 22. Since an insulation portion 73 of the double-sided wiring substrate is positioned inside the device, and the first pressure sensitive element and the second pressure sensitive element are provided on both sides of the insulation portion 73, the double-sided wiring substrate may also function as a support layer depending on the structural strength of the double-sided wiring substrate. In a configuration that uses the double-sided wiring substrate 70, as illustrated in FIGS. 12, 13, and 16, the insulation portion of the double-sided wiring substrate may not be used as the dielectric layer of each pressure sensitive element. In other words, separate dielectric members (81, 82) different from the wiring substrate are used as the dielectric layers of the pressure sensitive elements.

Figure 14:
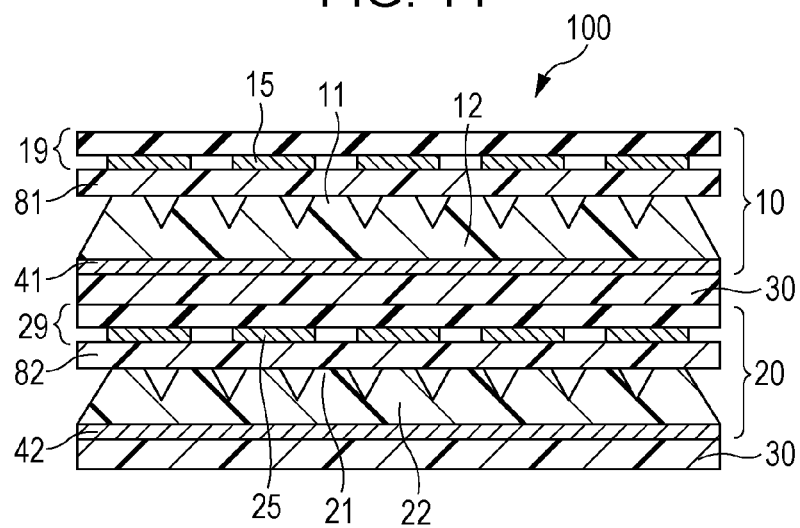
FIG. 14 is a schematic sectional view illustrating a modification of the stacked configuration of the pressure sensor according to an aspect of the present disclosure.
Figure 15:
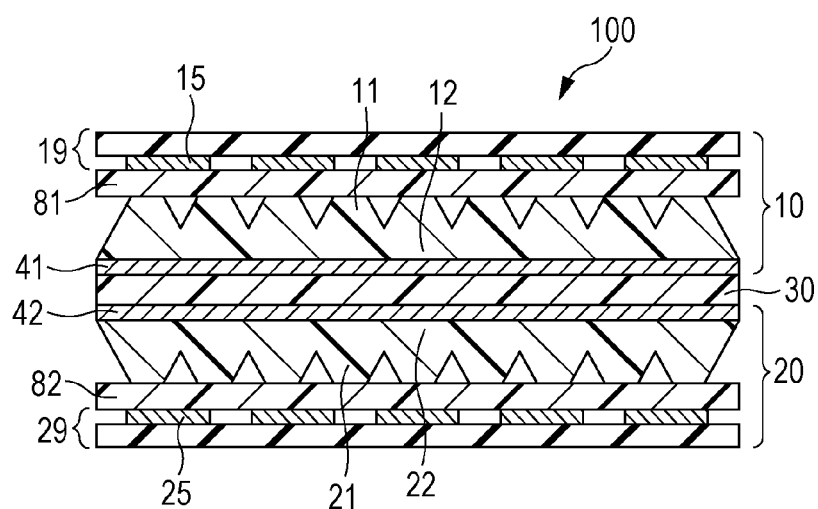
FIG. 15 is a schematic sectional view illustrating a modification of the stacked configuration of the pressure sensor according to an aspect of the present disclosure.

Out of the various stacked configurations illustrated in FIGS. 4 to 16, the pressure sensor 100 illustrated in FIGS. 4 to 13 corresponds to the first embodiment (that is, the embodiment with no common electrode layer provided), whereas the pressure sensor 100 illustrated in FIGS. 14 to 16 corresponds to the second embodiment (that is, the embodiment with the common electrode layers 41, 42 provided).

For instance, the pressure sensor having the stacked configuration illustrated in FIGS. 12, 13, and 16 has a wiring substrate, on both sides of which a plurality of wiring layers is formed, a first conductive layer and a second conductive layer in which a plurality of projections is formed, and a first dielectric layer and a second dielectric layer.

The wiring substrate and those layers are stacked so that the projection-formed surfaces of the first and second conductive layers face both sides of the wiring substrate with the first and second dielectric layers interposed between the wiring substrate and the first and second conductive layers.

Similarly, the pressure sensor having the stacked configuration illustrated in FIGS. 4, 5, 8, and 9 has at least one support body layer, a first wiring substrate and a second wiring substrate in which a plurality of wiring layers is formed, and a first conductive layer and a second conductive layer in which a plurality of projections is formed.

The first wiring substrate and the first conductive layer are stacked so that the projection-formed surface of the first conductive layer faces one surface of the first wiring substrate, a plurality of wiring layers is formed on the other surface of the first wiring substrate opposite to the one surface in contact with the first conductive layer, the second wiring substrate and the second conductive layer are stacked so that the projection-formed surface of the second conductive layer faces one surface of the second wiring substrate, and a plurality of wiring layers is formed on the other surface of the second wiring substrate opposite to the one surface in contact with the second conductive layer.

The first and second wiring substrates, the first and second conductive layers, and the support body layer are stacked.

Furthermore, the pressure sensor having the stacked configuration illustrated in FIGS. 6, 7, 10, 11, 14, and 15 has at least one support body layer, a first wiring substrate and a second wiring substrate in which a plurality of wiring layers is formed, a first dielectric layer and a second dielectric layer, and a first conductive layer and a second conductive layer in which a plurality of projections is formed.

The first wiring substrate, the first dielectric layer, and the first conductive layer are stacked with the first dielectric layer interposed between the first wiring substrate and the first conductive layer so that the projection-formed surface of the first conductive layer faces the surface of the first wiring substrate, in which a plurality of wiring layers is formed, and the second wiring substrate, the second dielectric layer, and the second conductive layer are stacked with the second dielectric layer interposed between the second wiring substrate and the second conductive layer so that the projection-formed surface of the second conductive layer faces the surface of the second wiring substrate, in which a plurality of wiring layers is formed.

The first and second wiring substrates, the first and second dielectric layers, the first and second conductive layers, and the support body layer are stacked.

[Method of Manufacturing Pressure Sensitive Sensor of Present Disclosure]

A method of manufacturing the pressure sensor of the present disclosure will be described. It is possible to manufacture the pressure sensor by stacking the components of the pressure sensitive elements 10 and 20. Specifically, it is possible to manufacture the pressure sensor by stacking the conductive layers, the wiring layers, and the dielectric layers, which are the components of the pressure sensitive elements.

The following is for illustrative purposes only, and a method of manufacturing the pressure sensor using the double-sided wiring substrate 70 will be described with reference to FIGS. 17, 18A, and 18B.

Figure 17:
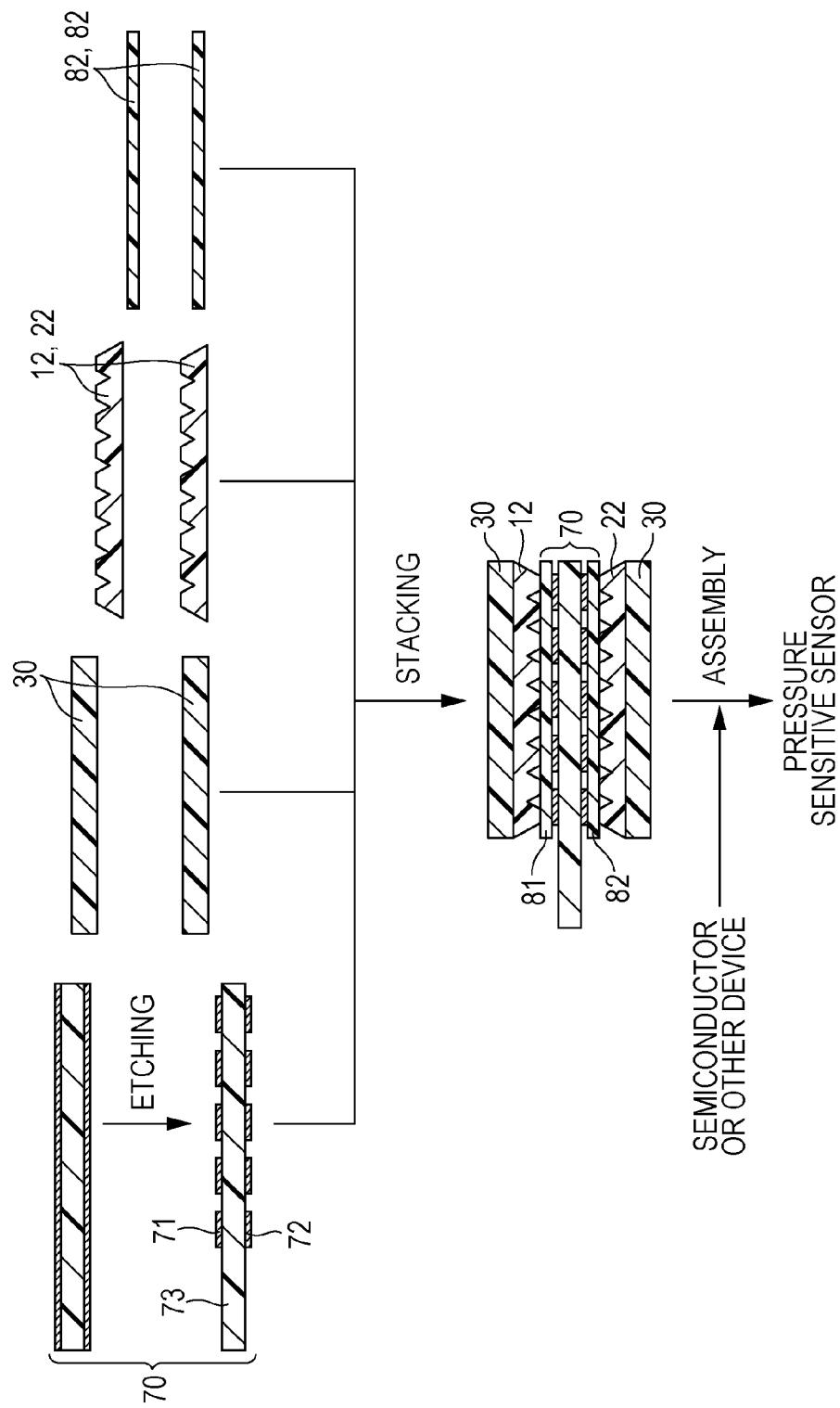
FIG. 17 is a schematic sectional view illustrating a method of manufacturing the pressure sensor according to an aspect of the present disclosure.
Figure 18A:
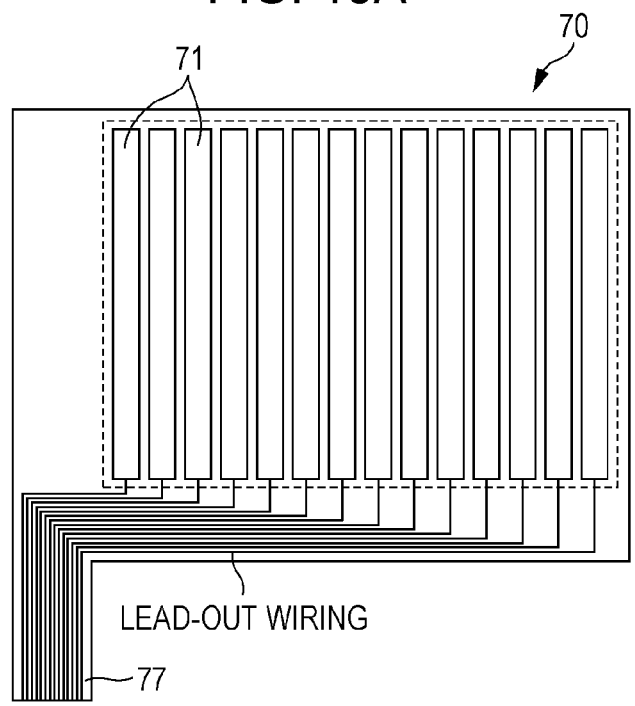
FIG. 18A is a top view schematically illustrating the configuration of a double-sided wiring substrate which is used in the method of manufacturing the pressure sensor according to an aspect of the present disclosure.
Figure 18B:
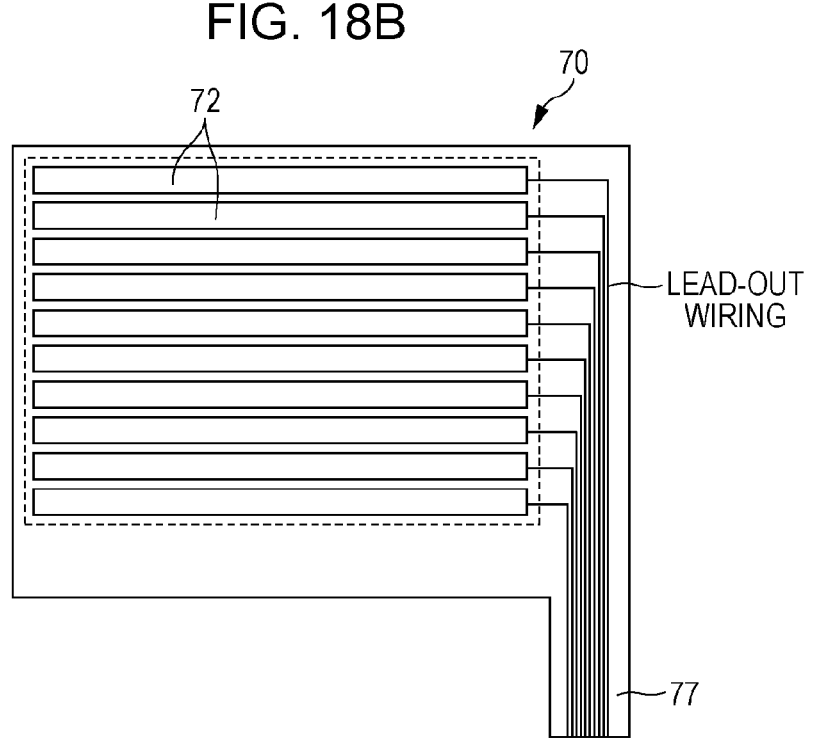
FIG. 18B is a bottom view schematically illustrating the configuration of a double-sided wiring substrate which is used in the method of manufacturing the pressure sensor according to an aspect of the present disclosure.

FIG. 17 is a view illustrating the concept of manufacturing process of the pressure sensor. In FIG. 17, the support substrate 30 for holding the pressure sensor may be two pieces of an insulating resin film. The two pieces of conductive members 12, 22 having a plurality of projections may each include a resin structure and a conductive filler uniformly present in the resin structure. The double-sided wiring substrate 70 may be such that copper foil is stacked on its both sides and the insulation portion is composed of polyimide film. The dielectric members 81, 82 may be resin members.

The "conductive members 12, 22 having projections" may be manufactured by using nanoimprint technology. The nanoimprint technology is a technology in which a mold with a pattern having depressions and projections is pressed against a resin body of a pattern-transferred material and thus the pattern formed in the mold is transferred to the resin body on the nano order. In contrast to the lithography technology, this technology enables the formation of fine patterns and a three-dimensional object with an inclination, such as a frustum of a cone. Since the nanoimprint technology uses a mold with a pattern having desired predetermined depressions and projections, the overall shape of a conductive member may be easily controlled and the projection height, projection shape, and projection distribution are easily controlled.

For the double-sided wiring substrate 70, etching processing is performed on the copper foil formed on its both sides. This enables the formation of a plurality of parallel wiring layers arranged on both sides of the wiring substrate in different directions and lead-out wiring for leading the parallel wiring layers to a substrate end (see FIGS. 18A, 18B). As illustrated in FIGS. 18A, 18B, lead-out portions 77 are each provided at an end of the double-sided wiring substrate.

Next, the support substrate 30, the conductive members 12, 22, the dielectric members 81, 82, and the double-sided wiring substrate 70 are stacked as illustrated to obtain a sensor structure part.

After the sensor structure part is obtained, the lead-out portions of the double-sided wiring substrate 70 are assembled so as to be electrically connected to a semiconductor device included in the measurement circuit via a connector or the like, and finally a pressure sensor is obtained.

[Linearity Control Under Low Load and High Load]

Finally the "linearity control under low load and high load" related to the present disclosure will be described. The present disclosure also provides the concept of controlling the linearity under low load and high load by using projections having elastic characteristics (specifically, the "first projections 11" and the "second projections 21" having elastic characteristics), and thus more effectively utilizing the capacitance change of the regions between the adjacent first projections 11, the adjacent second projections 21 (in other words, the regions corresponding to the depressions of the conductive layers). The capacitance of the "regions corresponding to the depressions" varies inversely with the thickness of a dielectric material, and capacitance change is smaller under low load but is larger under high load. Therefore, this has the opposite characteristics to the capacitance change due to a change in contact area (that is, the "contact area between the first projections and the first dielectric layer"/the "contact area between the second projections and the second dielectric layer"). The pressure sensor according to an aspect of the present disclosure actively utilizes the "regions corresponding to the depressions", thereby enabling control of linearity under low load and high load.

In this respect, high linearity characteristics of the pressure sensitive element is achieved by detecting and sensing two types of electrostatic capacitances. Specifically, the total electrostatic capacitance of the electrostatic capacitance generated between the projections (that is, the "first projections 11"/the "second projections 21") and the wiring layers (that is, the "first wiring layers" 15/the "second wiring layers 25") and the electrostatic capacitance generated in deformable "regions corresponding to the depressions" (that is, "regions between adjacent projections 11, 21") is detected and sensed, thereby achieving high linearity characteristics of the pressure sensitive element.

Although the embodiments of the present disclosure have been described in the above, only typical examples have been illustrated in the applicable range of the present disclosure. Therefore, it is to be well understood by those skilled in the art that the present disclosure is not limited to the embodiments described above and various modifications may be made.

Although the projections 11, 21 are assumed to have a frustum shape (shape such as a frustum of a cone, a frustum of a rectangular pyramid) in the embodiments described above, the present disclosure is not necessarily limited to this. The pressure sensor device of the present disclosure may have hemisphere-shaped projections 11, 21. In other words, at least part of a sectional outline of the projections 11, 21 (a sectional outline when the element is cut in a thickness direction) may have a curved shape. Even in this embodiment, the projections 11, 21 are deformable when the pressure sensor device is pressed. Although at least one support layer is assumed to be used in the embodiments described above, the present disclosure is not necessarily limited to this. For instance, in the case where the wiring substrates and/or the conductive layers have sufficient strength, the wiring substrates and/or the conductive layers may also serve as the support layers. In this case, the pressure sensor according to an aspect of the present disclosure has a structure without a support layer or a support body. The stacked structure of the pressure sensor according to the present disclosure may have overall flexibility. In other words, the stacked structure of the pressure sensor may be a flexible structure. In this case, the entire stacked structure may be bent for use and the number of types of applicable product increases. Also, such a stacked structure may be overall transparent. In other words, the stacked structure may have overall optical transparency. The wiring layer of each wiring substrate used for the pressure sensor is not limited to a single-layer configuration or a two-layer configuration and may be a three-layer configuration.

What is claimed is:

1. A pressure sensor comprising:
a first pressure sensitive element including a first conductive layer including first projections having conductivity, first wiring layers, and a first dielectric layer provided between the first projections and the first wiring layers; and
a second pressure sensitive element including a second conductive layer including second projections having conductivity, second wiring layers, and a second dielectric layer provided between the second projections and the second wiring layers, wherein:
the first pressure sensitive element is stacked over the second pressure sensitive element,
the first conductive layer includes a first conductive base layer on which the first projections are arranged,
the second conductive layer includes a second conductive base layer on which the second projections are arranged,
the first conductive layer and the second conductive layer are made of an elastic material, and
an elastic modulus of the first projections and the second projections is $10^4$ to $10^8$ Pa.

2. The pressure sensor according to claim 1, further comprising:
a measurement circuit that includes a cathode terminal and an anode terminal each electrically connected to the first pressure sensitive element and the second pressure sensitive element, and that, in operation, measures electrical capacitances of the first pressure sensitive element and the second pressure sensitive element;
a first electrical switch provided only between one of the cathode terminal and the anode terminal and the first pressure sensitive element; and
a second electrical switch provided only between the one of the cathode terminal and the anode terminal and the second pressure sensitive element.

3. The pressure sensor according to claim 2, wherein:
one of two first wiring layers adjacent to each other out of the first wiring layers is electrically connected to the cathode terminal while the other of the two first wiring layers adjacent to each other is electrically connected to the anode terminal, and
one of two second wiring layers adjacent to each other out of the second wiring layers is electrically connected to the cathode terminal while the other of the two second wiring layers adjacent to each other is electrically connected to the anode terminal.

4. The pressure sensor according to claim 1, wherein:
the first pressure sensitive element further includes a first common electrode layer that faces the first wiring layers, and
the second pressure sensitive element further includes a second common electrode layer that faces the second wiring layers.

5. The pressure sensor according to claim 4, further comprising
a measurement circuit that includes a cathode terminal and an anode terminal each electrically connected to the first pressure sensitive element and the second pressure sensitive element, and that measures electrical capacitances of the first pressure sensitive element and the second pressure sensitive element, wherein:
one of the first wiring layers and the first common electrode layer is electrically connected to the cathode terminal while the other of the first wiring layers and the first common electrode layer is electrically connected to the anode terminal, and
one of the second wiring layers and the second common electrode layer is electrically connected to the cathode terminal while the other of the second wiring layers and the second common electrode layer is electrically connected to the anode terminal.

6. The pressure sensor according to claim 1, wherein:
the first wiring layers extend in a first direction, and
the second wiring layers extend in a second direction different from the first direction.

7. The pressure sensor according to claim 1,
wherein the first conductive layer faces the second wiring layers so that the first projections and the second projections are each oriented in the same direction.

8. The pressure sensor according to claim 1,
wherein the first wiring layers face the second wiring layers so that the first projections and the second projections are respectively oriented in opposite directions.

9. The pressure sensor according to claim 1, further comprising a first wiring substrate and a second wiring substrate, wherein:
the first wiring layers are provided in the first wiring substrate, and
the second wiring layers are provided in the second wiring substrate.

10. The pressure sensor according to claim 9, wherein:
the first dielectric layer is provided in the first wiring substrate, and
the second dielectric layer is provided in the second wiring substrate.

11. The pressure sensor according to claim 1, further comprising
a double-sided wiring substrate having a first principal surface and a second principal surface on opposite side to the first principal surface, wherein:
the first wiring layers is provided in the first principal surface, and the second wiring layers is provided in the second principal surface.

12. The pressure sensor according to claim 11, wherein the double-sided wiring substrate is positioned between the first conductive layer and the second conductive layer.

13. The pressure sensor according to claim 1, further comprising
a support layer disposed between the first pressure sensitive element and the second pressure sensitive element.

14. The pressure sensor according to claim 1, wherein:
the first conductive base layer and the first projections are integrally formed, and
the second conductive base layer and the second projections are integrally formed.

15. A pressure sensor comprising:
a first pressure sensitive element including a first conductive layer including first projections having conductivity, first wiring layers, and a first dielectric layer provided between the first projections and the first wiring layers; and
a second pressure sensitive element including a second conductive layer including second projections having conductivity, second wiring layers, and a second dielectric layer provided between the second projections and the second wiring layers, wherein:
the first pressure sensitive element is stacked over the second pressure sensitive element,
the first conductive layer includes a first conductive base layer on which the first projections are arranged,
the second conductive layer includes a second conductive base layer on which the second projections are arranged,
the first conductive layer and the second conductive layer are made of an elastic material, and
the elastic material includes a resin and conductive fillers dispersed in the resin.

16. The pressure sensor according to claim 15, wherein the resin is at least one selected from the group consisting of a styrene-based resin, a silicone-based resin, an acrylic-based resin, a rotaxane-based resin, and an urethane-based resin.

17. The pressure sensor according to claim 15, wherein the conductive fillers is composed of at least one type of material selected from the group consisting of Au, Ag, Cu, C, ZnO, $In_2O_3$ and $SnO_2$.

18. A pressure sensor comprising:
a first pressure sensitive element including a first conductive layer including first projections having conductivity, first wiring layers, and a first dielectric layer provided between the first projections and the first wiring layers; and
a second pressure sensitive element including a second conductive layer including second projections having conductivity, second wiring layers, and a second dielectric layer provided between the second projections and the second wiring layers, wherein:
the first pressure sensitive element is stacked over the second pressure sensitive element,
the first conductive layer includes a first conductive base layer on which the first projections are arranged,
the second conductive layer includes a second conductive base layer on which the second projections are arranged, and
the first and second projections have a frustum shape or a hemisphere-shape.

* * * * *